US012573671B2

(12) United States Patent
Lee et al.

(10) Patent No.: US 12,573,671 B2
(45) Date of Patent: Mar. 10, 2026

(54) SOLID STATE BATTERY APPARATUS

(71) Applicants: LG ENERGY SOLUTION, LTD., Seoul (KR); The Regents of the University of California, Oakland, CA (US)

(72) Inventors: Jung-Pil Lee, Daejeon (KR); Jiyoung Kim, Daejeon (KR); Yuju Jeon, La Jolla, CA (US); Dongju Lee, La Jolla, CA (US); Zheng Chen, San Diego, CA (US)

(73) Assignees: LG ENERGY SOLUTION, LTD., Seoul (KR); The Regents of the University of California

( * ) Notice: Subject to any disclaimer, the term of this patent is extended or adjusted under 35 U.S.C. 154(b) by 0 days.

(21) Appl. No.: 19/009,844

(22) Filed: Jan. 3, 2025

(65) Prior Publication Data

US 2025/0266507 A1 Aug. 21, 2025

Related U.S. Application Data

(60) Provisional application No. 63/555,990, filed on Feb. 21, 2024.

(51) Int. Cl.
*H01M 10/42* (2006.01)
*H01M 4/02* (2006.01)
(Continued)

(52) U.S. Cl.
CPC ....... *H01M 10/4235* (2013.01); *H01M 4/134* (2013.01); *H01M 4/1395* (2013.01);
(Continued)

(58) Field of Classification Search
CPC ... H01M 4/386; H01M 4/387; H01M 10/0562
See application file for complete search history.

(56) References Cited

U.S. PATENT DOCUMENTS

| | | | |
|---|---|---|---|
| 2006/0286455 A1 | 12/2006 | Kim et al. | |
| 2013/0122362 A1 | 5/2013 | Sato et al. | |
| (Continued) | | | |

FOREIGN PATENT DOCUMENTS

| | | |
|---|---|---|
| CN | 116364858 A | 6/2023 |
| JP | 2005347147 A | 12/2005 |
| (Continued) | | |

OTHER PUBLICATIONS

PCT/KR2025/002396—International Search Report mailed on May 25, 2025, 6 pages.

*Primary Examiner* — Nathanael T Zemui
(74) *Attorney, Agent, or Firm* — K&L Gates LLP

(57) ABSTRACT

Solid state battery apparatus are provided. The present disclosure relates to a solid state battery comprising a cell which comprises a cathode, an anode, and a solid electrolyte positioned between the cathode and the anode. The anode comprises first particles comprising silicon and second particles comprising a material configured to form an alloy with lithium. The second particles are substantially softer than the first particles and configured to compensate for size changes of the first particles during charging and discharging cycles of the solid state battery such that, as the first particles expand in size, the second particles are compressed in size at a given pressure applied to the solid state battery and further such that, as the first particles shrink in size, the second particles expand in size at a given pressure applied to the solid state battery.

19 Claims, 3 Drawing Sheets

(51) Int. Cl.

| | | |
|---|---|---|
| *H01M 4/134* | (2010.01) | |
| *H01M 4/1395* | (2010.01) | |
| *H01M 4/40* | (2006.01) | |
| *H01M 4/62* | (2006.01) | |
| *H01M 10/0525* | (2010.01) | |

(52) U.S. Cl.
CPC ........... *H01M 4/405* (2013.01); *H01M 4/627* (2013.01); *H01M 10/0525* (2013.01); *H01M 2004/021* (2013.01); *H01M 2220/20* (2013.01)

(56) References Cited

U.S. PATENT DOCUMENTS

| 2019/0044133 A1 * | 2/2019 | Burshtain ............. H01M 4/134 |
|---|---|---|
| 2019/0280329 A1 * | 9/2019 | Waseda ............. H01M 10/0525 |
| 2022/0131133 A1 | 4/2022 | Kim et al. |
| 2023/0075357 A1 | 3/2023 | Goto |
| 2024/0063365 A1 | 2/2024 | Wakita |

FOREIGN PATENT DOCUMENTS

| JP | 2023036160 A | 3/2023 |
|---|---|---|
| KR | 100764619 B1 | 10/2007 |
| KR | 101489129 B1 | 2/2015 |
| KR | 101942922 B1 | 1/2019 |
| KR | 20220056080 A | 5/2022 |
| KR | 20230033489 A | 3/2023 |

* cited by examiner

SOLID STATE BATTERY APPARATUS

INCORPORATION BY REFERENCE TO ANY PRIORITY APPLICATIONS

Any and all applications for which a foreign or domestic priority claim is identified in the Application Data Sheet as filed with the present application re hereby incorporated by reference under 37 CFR 1.57.

BACKGROUND

Field

The present disclosure relates to solid state battery apparatus.

Secondary Batteries

Secondary batteries have become increasingly desirable power sources for a wide range of various electronic devices, such as cars, computers, cell phones, tools, scooter, bikes, electronic automobiles, power storage systems, drones, and other devices. Among secondary batteries, lithium-based batteries have gained particular prominence due to their ability to provide a desirable balance of voltage and energy density. In addition to their performance advantages, lithium ion secondary batteries contribute to addressing climate change by enabling the electrification of transportation and facilitating the integration of renewable energy sources. These batteries help reduce greenhouse gas emissions by powering electric vehicles and storing energy from intermittent renewable sources like solar and wind. Furthermore, the long cycle life and high energy density of lithium ion batteries may support the development of smart grids and decentralized energy systems, potentially improving overall energy efficiency and reducing reliance on fossil fuels. Traditionally, lithium secondary batteries include a liquid electrolyte, typically comprising a lithium salt dissolved in an organic solvent. However, there has been growing interest in developing an all solid-state lithium secondary battery as an alternative to conventional liquid electrolyte-based systems. Solid-state batteries offer potential advantages in terms of safety, stability, and energy density. Despite these potential benefits, the development of practical all solid-state lithium secondary batteries faces several significant challenges.

Challenges of all Solid-State Secondary Batteries

One challenge in solid-state battery design is achieving and maintaining sufficient lithium ion diffusivity within the solid electrolyte material. Further, volume changes (e.g. swelling and shrinking) of certain components of the battery—such as the electrode—may occur during discharging and charging of the battery. These volume changes may lead to mechanical stress or result in a loss of contact between various components within the battery structure. The loss of contact between battery components can cause degradation of charging and discharging characteristics, as well as deterioration of overall battery capacity. Researchers and engineers in the field of energy storage are actively working to address these challenges. Efforts are focused on developing new materials and battery designs that can achieve desirable lithium ion diffusivity while also accommodating the mechanical stresses associated with battery cycling. Improving the stability of interfaces within solid-state batteries remains an area of investigation. Overcoming the current limitations of solid-state battery systems could potentially lead to significant advancements in energy storage capabilities for a wide range of applications.

No Admission of Prior Art

The discussion in this section is intended to provide background information related to the present disclosure and does not constitute an admission of prior art.

SUMMARY

Advantageous Effects of Different Types of Metal Active Materials

By applying different types of metal active materials with different strengths, the weak metal material may act as an active material and as a buffer for size changes. All-solid-state battery that can be operated at low pressure by applying different metal active materials with different strengths and mechanical properties can be desirable.

Advantageous Effects of Different Particle Sizes

Good contact between active materials in all-solid-state batteries using lithium diffusion can be desirable. The contact can facilitate lithium diffusion by improving contact by using bi-modal mixed particles rather than single-sized particles. Lithium dendrites can be minimized at low pressure and high c-rate.

Various Aspects of the Present Disclosure

The present disclosure relates to a solid state battery comprising a cell which comprises a cathode, an anode, and a solid electrolyte positioned between the cathode and the anode. The anode comprises first particles comprising silicon and second particles comprising a material configured to form an alloy with lithium. The anode does not include carbon-based particles, sulfur-based particles, or oxide-based particles. The solid electrolyte is configured to enable transport of lithium ions between the cathode and the anode. The first particles and the second particles individually form discrete domains in the anode as opposed to forming a combined domain comprising silicon and the material. The second particles are substantially softer than the first particles and configured to compensate for size changes of the first particles during charging and discharging cycles of the solid state battery such that, as the first particles expand in size, the second particles are compressed in size at a given pressure applied to the solid state battery and further such that, as the first particles shrink in size, the second particles expand in size at a given pressure applied to the solid state battery, whereby the second particles generally maintain contact with one another and further with the first particles directly or indirectly, which allows the solid state battery to operate at a substantially lower pressure applied thereto than one that would be required in the absence of the second particles in the anode. A pressure under 10 MPa is applied to the solid state battery.

In one general aspect, the lithium ion diffusivity in the anode electrode ranges from $1 \times 10\text{-}14$ $cm^2/s$ to $1 \times 10\text{-}7$ $cm^2/s$.

In one general aspect, the first particles have a first hardness in a range of 6 to 8 Mohs hardness values, wherein the second particles have a second hardness in a range of 1 to 4 Mohs hardness values.

In one general aspect, the first particles have a first hardness and the second particles have a second hardness, wherein the second hardness is at least 2 Mohs hardness values less than the first hardness.

In one general aspect, the anode electrode has a thickness, wherein the thickness changes less than 10% during the charging and discharging cycles at a given pressure applied to the solid state battery.

In one general aspect, the thickness of the anode electrode is in a range of 10 μm to 100 μm.

In one general aspect, the material in the second particles includes a metal or a metal alloy.

In one general aspect, the material in the second particles includes tin, a tin alloy, copper, a copper alloy, aluminum, an aluminum alloy, magnesium, a magnesium alloy, zinc, a zinc alloy, silver, a silver alloy, gold, a gold alloy, lead, a lead alloy, indium, an indium alloy, or a combination thereof.

In one general aspect, the material in the second particles includes tin or a tin alloy.

In one general aspect, the second particles are substantially free of lithium at the time of assembly of the battery before initial charging and discharging.

In one general aspect, the present disclosure is directed to a solid state battery, wherein the anode electrode includes more first particles than second particles by total weight of the anode active material.

In one general aspect, the anode active material consists essentially of the first particles and the second particles.

In one general aspect, the anode active material includes: 10% to 90% by weight of the first particles based on a total weight of the anode active material; and 10% to 90% by weight of the second particles based on the total weight of the anode active material.

In one general aspect, the anode active material includes: 40% to 60% by weight of the first particles based on a total weight of the anode active material; and 40% to 60% by weight of the second particles based on the total weight of the anode active material.

In one general aspect, the anode electrode includes at least 90% by weight of the first particles and the second particles based on the total weight of the anode.

In one general aspect, the second particles and the first particles form a bimodal distribution in the anode, whereby the bimodal distribution is configured to reduce porosity of the anode electrode as the second particles are positioned in void space in a lattice of the first particles, the bimodal distribution increases surface contact during charging and discharging cycles of the solid state battery such that the second particles generally maintain contact with one another and further with the first particles directly or indirectly, which allows the solid state battery to operate at a substantially lower pressure applied thereto than one that would be required in the absence of the bimodal distribution in the anode.

In one general aspect, the first particles have a first average particle size in a range of 10 μm to 1,000 μm, wherein the second particles have a second particle size in a range of 10 nm to 1,000 nm.

In one general aspect, the first particles have a first average particle size, wherein the second particles have a second average particle size, wherein the second average particle size is less than half of the first average particle size.

In one general aspect, the anode electrode includes a porosity of no greater than 30% by volume based on a total volume of the anode.

In one general aspect, the solid state battery has a c-rate of greater than 0.33.

In one general aspect, the anode electrode further includes a binder.

In one general aspect, the anode electrode includes a porosity of at least 10% by volume based on a total volume of the anode.

In one general aspect, the anode electrode is under a pressure in a range of 1 MPa to 5 MPa.

In one general aspect, the solid state battery includes a specific capacity of greater than 100 mAh/g.

In one general aspect, a thickness of the cell is 1 mm or less.

In one general aspect, the present disclosure is directed to a method. The method including repeatedly charging and discharging the solid state battery. The anode electrode is in direct contact with the solid electrolyte and the direct contact is substantially maintained after the charging and discharging by compensating for size changes of the first particles by using the second particles.

The present disclosure also relates to a method of manufacturing a cell of a solid state battery. The method comprises depositing a cathode layer and depositing a solid electrolyte layer. The method comprises combining first particles and second particles to form a mixture. The first particles comprise silicon and the second particles comprise a material configured to form an alloy with lithium. The anode does not include carbon-based particles, sulfur-based particles, or oxide-based particles. The second particles are substantially softer than the first particles. The method comprises depositing the mixture in an anode layer such that the second particles are configured to compensate for size changes of the first particles during charging and discharging cycles of the solid state battery such that, as the first particles expand in size, the second particles are compressed in size at a given pressure applied to the solid state battery and further such that, as the first particles shrink in size, the second particles expand in size at a given pressure applied to the solid state battery, whereby the second particles generally maintain contact with one another and further with the first particles directly or indirectly, which allows the solid state battery to operate at a substantially lower pressure applied thereto than one that would be required in the absence of the second particles in the anode layer. The method comprises configuring the solid state battery such that the solid electrolyte layer is positioned intermediate the cathode layer and the anode layer in order to enable transport of lithium ions between the cathode layer and the anode layer. The first particles and the second particles individually form discrete domains in the anode layer as opposed to forming a combined domain comprising silicon and the material.

In one general aspect, the mixture further includes a solvent and a binder.

In one general aspect, the material in the second particles includes a metal or a metal alloy.

In one general aspect, the material in the second particles includes tin, a tin alloy, copper, a copper alloy, aluminum, an aluminum alloy, magnesium, a magnesium alloy, zinc, a zinc alloy, silver, a silver alloy, gold, a gold alloy, lead, a lead alloy, indium, an indium alloy, or a combination thereof.

In one general aspect, the anode layer includes: 10% to 90% by weight of the first particles based on a total weight of the anode layer; and 10% to 90% by weight of the second particles based on the total weight of the anode layer.

In one general aspect, the anode layer includes: 40% to 60% by weight of the first particles based on a total weight of the anode layer; and 40% to 60% by weight of the second particles based on the total weight of the anode layer.

In one general aspect, a solid state battery is produced by the method of manufacture of the battery.

SUMMARY NOT LIMITING

It is understood that this disclosure is not limited to the examples summarized in this Summary. Various other aspects are described and exemplified herein.

EXEMPLIFICATIONS NOT LIMITING

Figure 1:
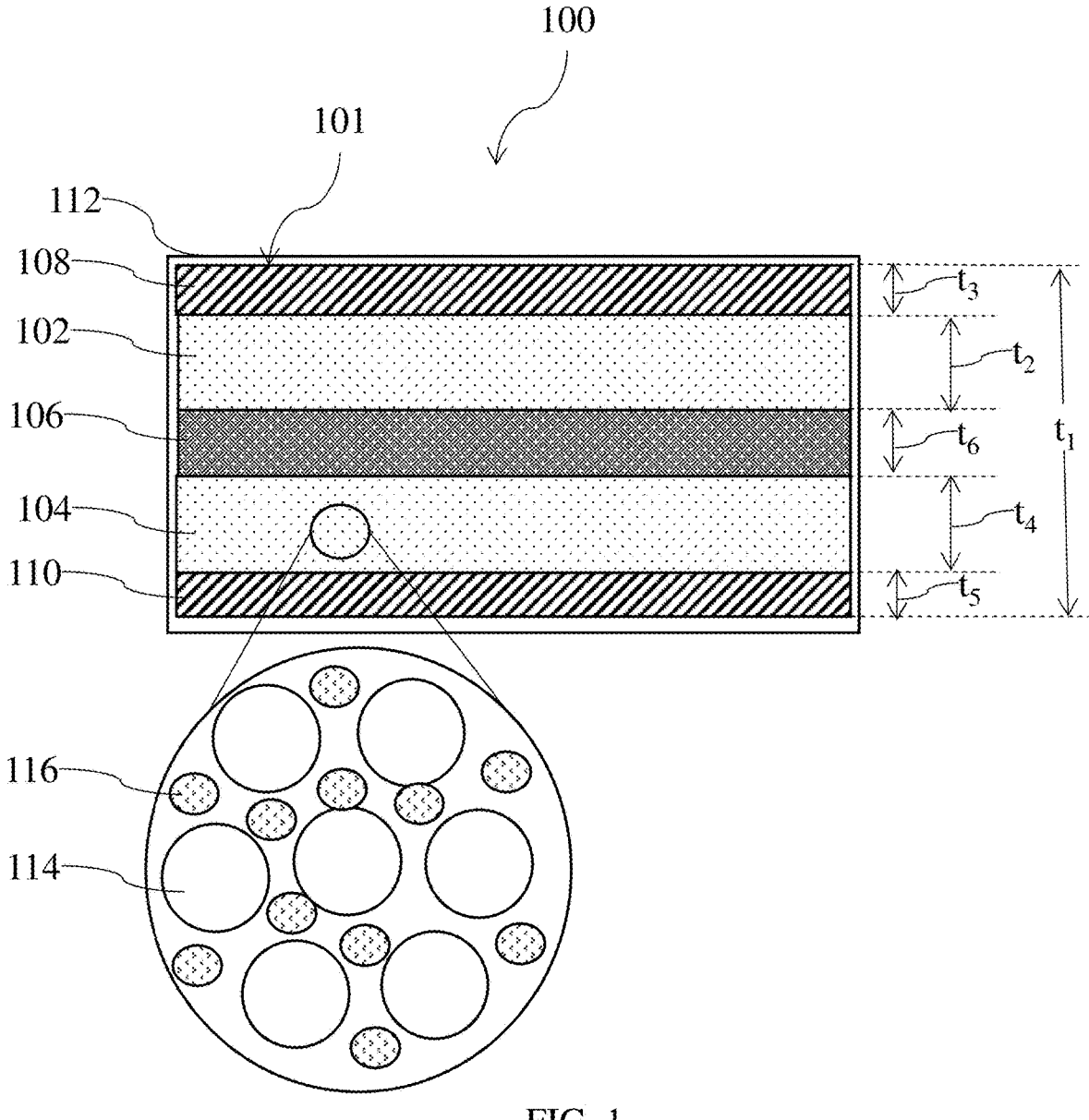
FIG. 1 is an example of a solid state battery according to the present disclosure.

The exemplifications set out herein illustrate certain non-limiting embodiments, in one form, and such exemplifications are not to be construed as limiting the scope of the appended claims in any manner.

DETAILED DESCRIPTION

Examples and Embodiments

The presently disclosed subject matter now will be described and discussed in more detail in terms of some specific embodiments and examples with reference to the accompanying drawings, in which some, but not all embodiments of the invention are shown. Like numbers refer to like elements or parts throughout unless otherwise referenced. The presently disclosed subject matter may be embodied in many different forms and should not be construed as limited to the specific embodiments set forth herein. Rather, these embodiments are provided so that this disclosure will satisfy applicable legal requirements. Indeed, many modifications and other embodiments of the presently disclosed subject matter will come to the mind of one skilled in the art to which the presently disclosed subject matter pertains. Therefore, it is to be understood that the presently disclosed subject matter is not to be limited to the specific embodiments disclosed and that modifications and other embodiments are intended to be included within the scope of the appended claims.

"A," "An" and "The"

As used herein, the singular form of a word includes the plural, unless the context clearly dictates otherwise. The plural encompasses the singular and vice versa. Thus, the references "a," "an" and "the" are generally inclusive of the plurals of the respective terms. For example, while the present disclosure has been described in terms of "a" layer, "a" substrate, "a" cell, and the like, more than one of these and other components, including combinations, can be used.

"About"

The term "about" indicates and encompasses an indicated value and a range above and below that value.

"Comprise," "Consisting Essentially Of", and "Consisting Of"

The words "comprise," "comprises," and "comprising" are to be interpreted inclusively rather than exclusively. Likewise, the terms "include," "including" and "or" should all be construed to be inclusive, unless such a construction is clearly prohibited from the context. A disclosure of an embodiment defined using the term "comprising" is also a disclosure of embodiments "consisting essentially of" and "consisting of" the disclosed components. The phrase "consisting of" excludes any element, step, or ingredient not specified.

"And/Or"

The term "and/or" used in the context of "X and/or Y" should be interpreted as "X," "Y," or "X and Y."

"On" and "Over"

As used herein, the terms "on," "applied on," "formed on, "deposited on," "provided on," and the like mean applied, formed, overlaid, deposited, or provided on in contact with an underlying or overlying surface. On the other hand, the terms "over" "applied over," "formed over," "deposited over," "overlay," "provided over," and the like, mean applied, formed, overlaid, deposited, or provided on or over but not necessarily in contact with the surface. For example, a formed layer "applied over" a substrate layer may contact the substrate without an intervening material; however, the same phrase does not preclude the presence of one or more other layers of the same or different composition located between the formed layer and the substrate layer.

Markush Group

As used herein, the term "combination thereof" included in any Markush-type expression means a combination or mixture of one or more elements selected from the group of elements disclosed in the Markush-type expression, and refers to the presence of one or more elements selected from the group. The term "combinations thereof" includes every possible combination of elements to which the term refers.

"Between"

As used herein, the expression "between" is inclusive of end points.

Numerical Ranges

Furthermore, all numerical ranges herein should be understood to include all integers, whole or fractions, within the range. Moreover, any numerical range recited herein is intended to include all sub-ranges subsumed therein, and these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth. When ranges are given, any endpoints of those ranges and/or numbers within those ranges can be combined with the scope of the present disclosure.

"Including," "Such As" and "For Example"

As used herein, "including," "such as," "for example," and like terms mean "including/such as/for example but not limited to."

Combination of Embodiments

As used herein, the term "example," particularly when followed by a listing of terms, is merely illustrative, and should not be deemed to be exclusive or comprehensive. Any embodiment disclosed herein can be combined with any other embodiment disclosed herein unless explicitly indicated otherwise.

Particle Size

As used herein, particle size refers to the mean particle diameter ($D_{50}$) as measured using microscopy (e.g., optical microscopy, electron microscopy, scanning electron microscopy (SEM), transmission electron microscopy (TEM), atomic force microscopy (AFM), confocal microscopy, X-ray microscopy, cryo-electron microscopy, Raman microscopy, or fluorescence microscopy). The size can be the diameter of spherical particles or the length along the largest dimension of ellipsoidal or otherwise irregularly shaped particles. As used herein, "$D_{50}$" of particles refers to the diameter at which 50% of the particles have a smaller diameter.

Solid State Lithium Ion Batteries

A solid state battery can receive a charge and discharge an electrical load various times. A solid state battery includes electrodes, a cathode electrode and an anode electrode, and an electrolyte to allow lithium ions to travel between the electrodes. In contrast to conventional liquid electrolyte batteries, the solid state battery does not include any flowable liquids. Forming a circuit between the electrodes causes electricity to flow between the electrodes. During charging of the lithium ion rechargeable battery, lithium ions are emitted from the cathode electrode and are intercalated into an active material of the anode electrode. During discharging of the lithium ion rechargeable battery, lithium ions are emitted from the anode electrode and are intercalated into an active material of the cathode electrode. As lithium ions reciprocate between the electrodes, they transfer energy.

Solid State Battery Configuration

The present disclosure provides a solid state battery 100 comprising a cathode electrode 102, an anode electrode 104, and a solid electrolyte layer 106 intermediate the cathode electrode 102 and the anode electrode 104. While listed as exemplary, the solid state battery 100 does not require all of these components. For example, in some configurations, such as in anodeless system, the anode electrode 104 may be omitted.

Optional Additional Layers

The solid state battery 100 can optionally comprise an additional layer or layers, such as, for example, a separator layer, a protective layer, an inhibitor layer, a solid electrolyte interface layer, or a combination thereof.

Protective Layer

For example, a protective layer may be incorporated between the electrodes 102 and 104 and the solid electrolyte layer 106 and/or a protective layer may be between the electrode 102 and current collector 110 in an anodeless system. The protective layer may also serve to mitigate dendrite formation, particularly on the anode side, thereby improving the overall cycle life and safety of the battery. In some cases, the protective layer may help improve interfacial stability between the electrodes and electrolyte, potentially reducing unwanted side reactions. Additionally, the protective layer may enhance the mechanical properties of the electrode-electrolyte interface, which could be beneficial for maintaining good contact during cycling.

Protective Layer Materials

This protective layer may comprise materials such as lithium phosphate, lithium titanate, lithium lanthanum zirconium oxide (LLZO), which can help prevent undesirable side reactions at the electrode-electrolyte interface. Other options for the protective layer material may include, but are not limited to, lithium niobium oxide ($LiNbO_3$), lithium tantalum oxide ($LiTaO_3$), lithium aluminum titanium phosphate (LATP), lithium aluminum germanium phosphate (LAGP), lithium silicate, and lithium boron oxide.

Separator Layer

A separator layer may also be included in some configurations of the solid state battery 100. These separator layers can provide additional mechanical support to the battery structure while still allowing for efficient ion transport. The separator layer may also be designed to have a gradient structure, with properties optimized for contact with both the cathode and anode materials. This gradient structure could involve, for example, varying the porosity, composition, or surface properties across the thickness of the separator. In some aspects, the separator surface may be functionalized with ion-conductive groups or coatings to enhance lithium ion transport at the electrode-separator interfaces. The separate layer may further be designed with multiple layers, by incorporating different materials optimized for specific functions, such as a mechanically strong core layer sandwiched between ion-conductive outer layers. The separator layer may additional be designed to be self-healing e.g., by reforming bonds after mechanical stress to help prevent short circuits caused by dendrite growth.

Separator Layer Materials

While traditional liquid electrolyte batteries often use porous polymer separators, solid state batteries may employ thin ceramic or glass-ceramic layers as separators. Materials such as LLZO, LATP (lithium aluminum titanium phosphate), or LAGP (lithium aluminum germanium phosphate) may be used for this purpose. Other separator layer materials that may be suitable for solid state batteries include lithium phosphate oxynitride (LiPON), lithium lanthanum titanate (LLTO), lithium garnet-type materials like Li6BaLa2Ta2O12, sulfide-based materials like Li10GeP2S12, and polymer-ceramic composites combining materials like polyethylene oxide (PEO) with ceramic fillers.

Solid State Battery Cell

FIG. 1 illustrates a cell 101 of a solid state battery 100 according to an embodiment. The cell 101 includes a cathode electrode 102, an anode electrode 104, and a solid electrolyte layer 106 intermediate the cathode electrode 102 and the anode electrode 104. The cell 101 can optionally include an additional layer or layers, such as, for example, a separator layer, a protective layer, an inhibitor layer, a solid electrolyte interface layer, or a combination thereof.

Cell Configuration

As illustrated in FIG. 1, the solid state battery 100 may include a single cell 101. In other examples, the solid state battery 100 can include multiple cells, such as, at least two cells, at least three cells, or at least four cells. Connecting the cells in series increases a voltage of the solid state battery 100 and connecting the cells in parallel increases an amphour capacity of the solid state battery 100.

Dimensions of Cell

The cell 101 may have a width, $w_1$, a length, $l_1$, and a thickness, $t_1$.

Thickness of Cell

A thickness, $t_1$, of the cell 101 can be at or about any number in a range of from about 100 μm to about 5000 μm, such as about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400,410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1100, 1200, 1300, 1400, 1500, 1600, 1700, 1800, 1900, 2000, 3000, 4000, or 5000 μm. In some embodiments, the thickness, $t_1$, of the cell 101 may be within a range formed by selecting any two numbers listed above or by selecting any two numbers within the range of from about 100 μm to about 5000 μm, e.g., between about 100 μm and about 5,000 μm or about 100 μm and about 1,000 μm.

Aspect Ratio of Width

The width, $w_1$, of the cell 101 may be substantially greater than the thickness, $t_1$, of the cell 101. In some embodiments, an aspect ratio of the width, $w_1$, to the thickness, $t_1$, may be at least 10, at least 20, at least 30, at least 40, at least 50, at least 60, at least 70, at least 80, at least 90, at least 100, at least 110, at least 120, at least 130, at least 140, at least 150, at least 160, at least 170, at least 180, at least 190, at least 200, at least 210, at least 220, at least 230, at least 240, at least 250, at least 260, at least 270, at least 280, at least 290, at least 300, at least 350, at least 400, at least 450, at least 500, at least 550, at least 600, at least 650, at least 700, at least 750, at least 800, at least 850, at least 900, at least 950, at least 1000, at least 2000, at least 3000, at least 4000, at least 5000, at least 6000, at least 7000, at least 8000, at least 9000, or at least 10000.

Aspect Ratio of Length

The length, $l_1$, of the cell 101 may be substantially greater than the thickness, $t_1$, of the cell 101. In some embodiments, an aspect ratio of the length, $l_1$, to the thickness, $t_1$, may be at least 10, at least 20, at least 30, at least 40, at least 50, at least 60, at least 70, at least 80, at least 90, at least 100, at least 110, at least 120, at least 130, at least 140, at least 150, at least 160, at least 170, at least 180, at least 190, at least 200, at least 210, at least 220, at least 230, at least 240, at least 250, at least 260, at least 270, at least 280, at least 290, at least 300, at least 350, at least 400, at least 450, at least 500, at least 550, at least 600, at least 650, at least 700, at least 750, at least 800, at least 850, at least 900, at least 950, at least 1000, at least 2000, at least 3000, at least 4000, at least 5000, at least 6000, at least 7000, at least 8000, at least 9000, or at least 10000.

Cathode Electrode

The cathode electrode 102 is associated with one polarity (e.g., positive) of the solid state battery 100. The cathode electrode 102 is configured as a positive electrode during discharge of the solid state battery 100. The cathode electrode 102 is suitable for lithium ion diffusion between a current collector 108 and the solid electrolyte layer 106. The cathode electrode 102 is in electrical communication with the current collector 108.

Cathode Electrode Positioning

In embodiments, the cathode electrode 102 is formed over and in direct contact with the current collector 108. In other embodiments, another functional layer may be interposed between the cathode electrode 102 and the current collector 108.

Materials for Cathode Electrode

The cathode electrode 102 may be capable of reversible intercalation and deintercalation of lithium ions. For example, the cathode electrode 102 can comprise a cathode active material alone. In other examples, the cathode electrode 102 may optionally include one or more of a conductive carbon, a solid electrolyte material, and a binder. Optionally, the cathode electrode 102 may further comprise an additive, such as, for example, an oxidation stabilizing agent, a reduction stabilizing agent, a flame retardant, a heat stabilizer, an antifogging agent, a thickener, a plasticizer, an ion conductivity enhancer, a binder (described in detail further below), a dispersant, a wetting agent, an adhesion promoter, a crosslinking agent, a colorant, the like, or a combination thereof.

Examples of Additives

Examples of these additives may include butylated hydroxyanisole (BHA) or butylated hydroxytoluene (BHT) as oxidation stabilizing agents, ascorbic acid or sodium sulfite as reduction stabilizing agents, aluminum hydroxide or magnesium hydroxide as flame retardants, phenolic compounds or phosphites as heat stabilizers, polyethylene glycol or silica nanoparticles as antifogging agents, carboxymethyl cellulose (CMC) or xanthan gum as thickeners, dibutyl phthalate or triethyl citrate as plasticizers, ceramic fillers or ionic liquids as ion conductivity enhancers, polyvinylpyrrolidone or sodium dodecyl sulfate as dispersants, polysorbates or poloxamers as wetting agents, silanes or titanates as adhesion promoters, peroxides or aziridines as crosslinking agents, and carbon black or metal oxides as colorants.

Cathode Active Material

The cathode active material can include lithium cobalt oxide ($LiCoO_2$), lithium nickel oxide ($LiNiO_2$), $Li[Ni_aCo_bMn_cM^1_d]O_2$ (wherein $M^1$ is any one element elected from the group consisting of Al, Ga, In, or a combination thereof, $0.3 \leq a < 1.0$, $0 \leq b \leq 0.5$, $0 \leq c \leq 0.5$, $0 \leq d < 0.1$, and $a+b+c+d=1$), $Li(Li_eM^2_{f-e-f}M^3_{f'})O_{2-2}A_g$ (wherein $0 \leq e \leq 0.2$, $0.6 \leq f \leq 1$, $0 \leq f' \leq 0.2$, $0 \leq g \leq 0.2$, $M^2$ includes Mn and at least one element selected from the group consisting of Ni, Co, Fe, Cr, V, Cu, Zn and Ti, $M^3$ is at least one element selected from the group consisting of Al, Mg and B, and A is at least one element selected from the group consisting of P, F, S and N), or those compounds substituted with one or more transition metals; lithium manganese oxides such as those represented by the chemical formula of $Li^{1+h}Mn_{2-h}O_4$ (wherein $0 \leq h \leq 0.33$), $LiMnO_3$, $LiMn_2O_3$, $LiMnO_2$, or the like; lithium copper oxide ($Li_2CuO_2$); vanadium oxides such as $LiV_3O_8$, $V_2O_5$ or $Cu_2V_2O_7$; Ni-site type lithium nickel oxides represented by the chemical formula of $LiNi_{1-i}M^4_iO_2$ (wherein $M^4$=Co, Mn, Al, Cu, Fe, Mg, B or Ga, and $0.01 \leq y \leq 0.3$); lithium manganese composite oxides represented by the chemical formula of $LiMn_{2-j}M^5_jO_2$ (wherein $M^5$=Co, Ni, Fe, Cr, Zn, or Ta, and $0.01 \leq y \leq 0.1$) or $Li_2Mn_3M^6O_8$ (wherein $M^6$=Fe, Co, Ni, Cu, or Zn); $LiMn_2O_4$ in which Li is partially substituted with an alkaline earth metal ion; disulfide compounds; $LiFe_3O_4$, $Fe_2(MoO_4)_3$; the like; or combinations thereof.

Phosphate-Based Materials

In addition to the cathode active materials previously mentioned, the cathode electrode may include other types of materials. For example, lithium iron phosphate (LiFePO4) may be used as a cathode active material due to its excellent thermal stability and long cycle life. Other phosphate-based materials such as lithium manganese iron phosphate (LiMnxFel-xPO4), lithium vanadium phosphate (LiVOPO4), lithium titanium phosphate (LiTi2(PO4)3), lithium nickel phosphate (LiNiPO4), fluorophosphates such as LiVPO4F or LiFeSO4F, or lithium cobalt phosphate (LiCoPO4) may also be suitable.

Layered Oxide Materials

The cathode active material may also include layered oxide materials with various compositions, such as Li(Ni1-x-yCoxMny)O2 (NCM) or Li(Ni1-x-yCoxAly)O2 (NCA), where the ratios of Ni, Co, Mn, and Al can be adjusted to optimize performance characteristics. For instance, NCM materials with high nickel content, such as NCM811 (LiNi0.8Co0.1Mn0.1O2), may be used to achieve higher energy density. In some cases, the cathode active material may comprise spinel structures like LiNi0.5Mn1.5O4, which can offer high voltage operation. Alternatively, materials with tavorite structures, such as LiFeSO4F or LiVPO4F, may be employed for their potential for high energy density and good thermal stability.

Composite or Blended Cathode Materials

Composite or blended cathode materials, combining two or more active materials, may also be used. For example, a blend of layered oxides and spinel materials might be employed to balance energy density and power capability. As another example, lithium iron phosphate may be blended with one or more of the cathode active materials described above. In some embodiments, the cathode active material may include surface-modified versions of the aforementioned compounds, where the surface modification aims to improve stability, conductivity, or other performance metrics.

Emerging Classes of Materials

The cathode active material may also include emerging classes of materials such as disordered rock salt structures (e.g., Li3NbO4-based materials), lithium-rich anti-perovskites (e.g., Li3OCl), cation-disordered oxides (e.g., Li—Mn—V—O systems), or high-entropy oxides, which may offer desirable combinations of high capacity and structural stability. In some cases, the cathode active material may incorporate dopants or substitutional elements to further tune its electrochemical properties.

Particulate Nature of Cathode Active Material

The cathode active material can be particle shaped. The cathode active material can have a particle size in a range of from about 1 nm to about 1000 $\mu$m, such as about any of 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 550 nm, 600 nm, 650 nm, 700 nm, 750 nm, 800 nm, 850 nm, 900 nm, 950 nm, 1000 nm, 5 $\mu$m, 10 $\mu$m, 15 $\mu$m, 20 $\mu$m, 25 $\mu$m, 30 $\mu$m, 35 $\mu$m, 40 $\mu$m, 45 $\mu$m, 50 $\mu$m, 55 $\mu$m, 60 $\mu$m, 65 $\mu$m, 70 $\mu$m, 75 $\mu$m, 80 $\mu$m, 85 $\mu$m, 90 $\mu$m, 95 $\mu$m, 100 $\mu$m, 110 $\mu$m, 120 $\mu$m, 130 $\mu$m, 140 $\mu$m, 150 $\mu$m, 160 $\mu$m, 170 $\mu$m, 180 $\mu$m, 190 $\mu$m, 200 $\mu$m, 210 $\mu$m, 220 $\mu$m, 230 $\mu$m, 240 $\mu$m, 250 $\mu$m, 260 $\mu$m, 270 $\mu$m, 280 $\mu$m, 290 $\mu$m, 300 $\mu$m, 310 $\mu$m, 320 $\mu$m, 330 $\mu$m, 340 $\mu$m, 350 $\mu$m, 360 $\mu$m, 370 $\mu$m, 380 $\mu$m, 390 $\mu$m, 400 $\mu$m, 410 $\mu$m, 420 $\mu$m, 430 $\mu$m, 440 $\mu$m, 450 $\mu$m, 460 $\mu$m, 470 $\mu$m, 480 $\mu$m, 490 $\mu$m, 500 $\mu$m, 550 $\mu$m, 600 $\mu$m, 650 $\mu$m, 700 $\mu$m, 750 $\mu$m, 800 $\mu$m, 850 $\mu$m, 900 $\mu$m, 950 $\mu$m, or 1,000 $\mu$m. In embodiments, particle size of the cathode active material may be within a range formed by selecting any two numbers listed above or by selecting any two numbers in the range of from about 1 nm to about 1000 $\mu$m, e.g., between about 10 nm and about 1,000 $\mu$m. Gaps between cathode active material particles in the cathode electrode 102 can be filled with the solid electrolyte material.

Amount of Cathode Active Material in Cathode Electrode

The amount of the cathode active material in the solid state battery 100 affects the charge and discharge capacity of the solid state battery 100. In order to manufacture a high-capacity cathode electrode 102, a high level of cathode active material can be included in the cathode electrode 102. For example, the cathode electrode 102 includes at, about, or greater than 1, 5, 10, 15, 20, 25, 30, 35, 40, 45, 50, 55, 60, 65, 70, 75, 80, 85, 90, 95, 98, or 99 wt % based on the total weight of the cathode electrode 102. In embodiments, cathode active material in the cathode electrode 102 may be within a range formed by selecting any two numbers listed above or by selecting any two numbers within the range from greater than 0 to about 100 wt %, e.g., between about 40 wt % and about 98 wt %.

Conductive Material in Cathode Electrode

The conductive material in the cathode electrode 102 is not particularly limited, as long as it has conductivity while not causing any chemical change in the corresponding solid state battery 100. For example, the conductive material can comprise graphite, such as natural graphite or artificial graphite; carbon black, such as acetylene black, ketjen black, channel black, furnace black, lamp black or thermal black;

conductive fibers, such as carbon fibers or metal fibers; carbon nanotubes (CNT), including both singled-walled carbon nanotubes (SWCNT) and multi-walled carbon nanotubes (MWCNT); metal powder, such as fluorocarbon, aluminum or nickel powder; conductive whiskers, such as zinc oxide or potassium titanate; conductive metal oxides, such as titanium oxide; conductive polymers, such as polyphenylene derivatives; graphene, metallic nanowires (e.g. silver nanowires), indium tin oxide (ITO), antimony-doped tin oxide (ATO), fluorine-doped tin oxide (FTO), aluminum-doped zinc oxide (AZO), gallium-doped zinc oxide (GZO), conductive ceramics like titanium nitride or titanium carbide, the like, or combinations thereof.

Amount of Conductive Material in Cathode Electrode

The cathode electrode 102 includes at or about 1, 3, 4, 5, 6, 7, 8, 9, 10, 11, 12, 13, 14, 15, 16, 17, 18, 19, 20, 21, 22, 23, 24, 25, 26, 27, 28, 29, or 30 wt % of conductive material based on the total weight of the cathode electrode 102. In embodiments, conductive material in the cathode electrode 102 may be within a range formed by selecting any two numbers listed in the immediately previous sentence, e.g., between about 1 wt % and about 30 wt %.

Materials for Binder

The binder can comprise various types of binder polymers, such as, for example, polyvinylidene fluoride-co-hexafluoropropylene (PVdF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, ethylene-propylene-diene monomer (EPDM), sulfonated EPDM, styrene butadiene rubber (SBR), fluororubber, polyacrylic acid, polyimide, polyamide-imide, polyurethane, polyethylene oxide (PEO), poly(ethylene-co-vinyl acetate) (PEVA), poly(vinyl acetate) (PVA), chitosan, guar gum (GG), xanthan gum, carrageenan, pectin, water-soluble polymers, lignin, polymers thereof whose hydrogen atoms are substituted with Li, Na or Ca, various copolymers thereof, the like, or combinations thereof.

Other Binder Materials

In addition to the binder materials previously mentioned, other types of binder materials may be used in the cathode electrode to enhance its performance and stability. For instance, water-soluble binders such as sodium alginate, gelatin, or polyacrylamide may be employed to improve the environmental friendliness of the electrode manufacturing process. These binders may also offer advantages in terms of electrode flexibility and adhesion strength. In some cases, conductive binders like poly(3,4-ethylenedioxythiophene): poly(styrene sulfonate) (PEDOT:PSS) or polyaniline (PANI) may be used to simultaneously improve both the mechanical integrity and electrical conductivity of the electrode.

Novel Binder Systems

Novel binder systems, such as self-healing polymers or supramolecular assemblies, may be incorporated to enhance the long-term stability and cycle life of the battery. Additionally, composite binders combining multiple polymers or incorporating inorganic nanoparticles may be utilized to tailor the mechanical, thermal, and electrochemical properties of the electrode. In some embodiments, bio-derived or biodegradable binders, such as cellulose derivatives or chitosan, may be employed to reduce the environmental impact of battery production and disposal.

Amount of Binder in the Cathode Electrode

The cathode electrode 102 may include at or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % of binder based on the total weight of the cathode electrode 102. In embodiments, binder in the cathode electrode 102 may be within a range formed by selecting any two numbers listed in the immediately previous sentence, e.g., between about 1 wt % and about 30 wt %.

Solid Electrolyte Material

The solid electrolyte material in the cathode electrode 102 can be configured the same as the material for the solid electrolyte layer 106 discussed below. The solid electrolyte material in the cathode electrode 102 can be the same as or different than the material for the solid electrolyte layer 106.

Amount of Solid Electrolyte Material in Cathode Electrode

The cathode electrode 102 may include about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % of solid electrolyte material based on the total weight of the cathode electrode 102. In embodiments, the amount of solid electrolyte material in the cathode electrode 102 may be within a range formed by selecting any two numbers listed in the immediately previous sentence, e.g., between about 1 wt % and about 30 wt %.

Thickness of Cathode Electrode

A thickness, $t_2$, of the cathode electrode 102 can be at or about any number in a range of from greater than 0 to 1000 μm, such as 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400,410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1,000 μm. In embodiments, the thickness, $t_2$, of the cathode electrode 102 may be within a range formed by selecting any two numbers listed above or by selecting any two numbers within the range of from greater than 0 to about 1000 μm, e.g., between about 10 μm and about 1,000 μm.

Porosity of Cathode Electrode

A porosity of the cathode electrode 102 can be at or about any number in a range of from 0 to 20 vol %, such as 0, 1, 2 3, 4, 5, 6, 7, 8, 9, 10, 11, 12, 13, 14, 15, 16, 17, or 18 vol % or any other vol % within the range of 0 to 20 vol %, based on the total volume of the cathode electrode 102. In embodiments, the porosity of the cathode electrode 102 may be within a range formed by selecting any two numbers listed above or by selecting any two numbers within the range of 0 to 20 vol %, e.g., between 0 vol % and about 18 vol %.

Lithium Ion Diffusivity of Cathode Electrode

The cathode electrode 102 can include a lithium ion diffusivity at or about any number in a range of from greater than 0 to $1\times10^{-7}$ cm²/s, such as $1\times10^{-14}$ cm²/s, $1\times10^{-13}$ cm²/s, $1\times10^{-12}$ cm²/s, $1\times10^{-11}$ cm²/s, $1\times10^{-10}$ cm²/s, $1\times10^{-9}$ cm²/s, $1\times10^{-8}$ cm²/s, or $1\times10^{-7}$ cm²/s. In embodiments, the lithium ion diffusivity of the cathode electrode 102 may be within a range formed by selecting any two numbers listed above or by selecting any two numbers within the range of from greater than 0 to $1\times10^{-7}$ cm²/s, e.g., between $1\times10^{-14}$ cm²/s and about $1\times10^{-7}$ cm²/s.

Current Collector at Cathode Electrode

The current collector 108 collects electrical energy generated at the cathode electrode 102 and supports the cathode electrode 102.

Materials for Current Collector at Cathode Electrode

The material of the current collector 108 is not particularly limited as long as it allows adhesion of the cathode electrode 102, has a suitable electrical conductivity, and does not cause significant chemical changes in the corresponding solid state battery 100 in the voltage range of the solid state battery 100. For example, the current collector 108 is made of or includes various materials, such as, a metal, a conductive carbon, or a conductive ceramic, although not limited thereto. The metal of the current collector 108 may include one or more selected from the group consisting aluminum, an aluminum alloy, copper, a copper alloy, nickel, a nickel alloy, titanium, a titanium alloy, iron, an iron alloy (e.g., steel, stainless steel), silver, a silver alloy, gold, platinum, palladium, chromium, molybdenum, tungsten, tantalum, niobium, zirconium, vanadium, manganese, cobalt, indium, tin, lead, bismuth, or a combination thereof, although not limited thereto.

Current Collector Geometry

The current collector 108 may also be configured in various other geometries to optimize its performance and integration with the cathode electrode 102, and may be sized for specific form factors, such as pouch, cylindrical, and/or prismatic form factors.

Shape of Current Collector at Cathode Electrode

It is possible to increase the adhesion of the cathode electrode 102 to the current collector 108 by forming fine surface irregularities on the surface of the current collector 108. The current collector 108 may have various shapes, such as, for example, a film, a sheet, a foil, a net, a porous body, a foam, a non-woven web, the like, or combinations thereof.

Examples of Shape and Size of Current Collector

For instance, the current collector 108 may be structured as a mesh or grid, which can provide enhanced mechanical support while maintaining high surface area for electrode adhesion. In some embodiments, the current collector 108 may be designed with a corrugated or wavy pattern, potentially increasing the contact area with the cathode material and improving overall conductivity. The current collector 108 may also be fabricated as a perforated sheet, allowing for better electrolyte penetration and ion transport. In certain cases, the current collector 108 may be formed as a three-dimensional structure, such as an interconnected network of fibers or a honeycomb-like configuration, which could enhance the structural integrity of the electrode assembly while facilitating efficient current collection.

Thickness of Current Collector at Cathode Electrode

A thickness, $t_3$, of the current collector 108 can be at or about any number in a range of from greater than 0 to 500 μm, such as 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400,410, 420, 430, 440, 450, 460, 470, 480, 490, or 500 μm. In embodiments, the thickness, $t_3$, of the current collector 108 may be within a range formed by selecting any two numbers listed above or by selecting any two numbers within the range of from greater than 0 to 500 μm, e.g., between about 5 μm and about 500 μm.

Manufacturing Methods for Cathode Electrode

The cathode electrode 102 may be obtained by various methods.

Dry Powder Coating Process

For instance, a dry powder coating process may be employed, where the cathode active material, conductive additives, and binder are mixed in a dry state and then directly applied to the current collector 108 using electrostatic deposition or mechanical compression. This method may reduce environmental impact by reducing use of solvents.

3D Printing

In some cases, the cathode electrode 102 may be fabricated using additive manufacturing techniques such as 3D printing. This approach allows for precise control over the electrode structure and porosity, potentially enhancing the electrode's performance and energy density. Various 3D printing methods, including fused deposition modeling (FDM), selective laser sintering (SLS), or direct ink writing (DIW), may be utilized depending on the specific materials and desired electrode properties.

Electrospinning

Another method for manufacturing the cathode electrode 102 may involve electrospinning. In this process, a solution containing the cathode active material, conductive additives, and a polymer binder is extruded through a nozzle under an electric field, resulting in the formation of nanofibers. These fibers can be collected directly on the current collector 108 to form a highly porous electrode structure with increased surface area.

Tape Casting

In some embodiments, the cathode electrode 102 may be prepared using a tape casting method. This technique involves spreading a slurry of electrode materials onto a moving carrier film using a doctor blade, followed by drying and calendaring. The resulting electrode tape can then be laminated onto the current collector 108.

Spray Coating

Alternatively, the cathode electrode 102 may be fabricated using a spray coating technique. In this method, a fine mist of the electrode slurry is sprayed onto the current collector 108 using compressed air or ultrasonic atomization. This approach may allow for the creation of thin, uniform electrode layers and can be particularly useful for large-scale production.

Freeze-Casting

In certain cases, the cathode electrode 102 may be manufactured using a freeze-casting method. This process involves freezing a slurry of electrode materials, followed by sublimation of the ice to create a porous structure. The resulting porous electrode can then be sintered and attached to the current collector 108.

Sol-Gel Process

For some applications, the cathode electrode 102 may be prepared using a sol-gel process. This method involves the formation of a colloidal suspension (sol) that is then converted into a gel-like network containing the cathode active material and other components. The gel can be applied to the current collector 108 and subsequently heat-treated to form the final electrode structure.

Slurry-Based Process

For example, the cathode active material can be mixed and agitated with a solvent, and optionally a binder, conductive material, and a dispersing agent to form slurry. Then, the slurry can be applied (e.g., coated) onto the current collector 108, followed by pressing and drying, to obtain the cathode electrode 102.

Application Methods for Slurry for Cathode Electrode

The application of the slurry to the cathode electrode 102 may include using a technique selected from the group consisting of slot die coating, gravure coating, spin coating, spray coating, roll coating, curtain coating, extrusion, casting, screen printing, inkjet printing, spray printing, gravure printing, heat transfer printing, a Toppan printing method, intaglio printing, offset printing, the like, and combinations thereof.

Double Layer Slot Die Coating

In some embodiments, the cathode electrode 102 may be fabricated using a double layer slot die coating (DLD) technique. This method involves the simultaneous application of two distinct layers of electrode materials onto the current collector 108 in a single pass. The DLD process may allow for the creation of gradient structures within the electrode, potentially optimizing both the electrochemical performance and mechanical properties of the cathode. Additionally, this technique may enable the incorporation of functional interlayers or protective coatings as part of the electrode manufacturing process, potentially enhancing the overall battery performance and longevity.

Solvent for Slurry for Cathode Electrode

The solvent for forming the cathode electrode 102 may include water and/or an organic solvents, such as, for example, N-methyl pyrrolidone (NMP), dimethyl formamide (DMF), acetone, dimethyl acetamide, dimethyl sulfoxide (DMSO), isopropyl alcohol, the like, or combinations thereof. The solvent may be used in an amount sufficient to dissolve and disperse the electrode ingredients, such as the cathode active material, binder, and conductive material, considering the slurry coating thickness, production yield, the like, or combinations thereof. Additional solvents that may be used include ethanol, methanol, propanol, butanol, ethyl acetate, methyl ethyl ketone, tetrahydrofuran, diethyl ether, and toluene.

Solvent-Free Methods

In some aspects of the disclosure, the cathode electrode 102 may be prepared using a solvent-free method, such as dry powder processing or melt extrusion, which reduce the use of liquid solvents and may offer environmental and cost benefits.

Dispersing Agent for Slurry for Cathode Electrode

The dispersing agent forming the cathode electrode 102 may include an aqueous dispersing agent and/or an organic dispersing agent, such as, for example, N-methyl-2-pyrrolidone. Other possible dispersing agents may include polyvinylpyrrolidone (PVP), carboxymethyl cellulose (CMC), sodium dodecyl sulfate (SDS), Triton X-100, polyethylene glycol (PEG), polyacrylic acid (PAA), and various surfactants such as polysorbates or poloxamers.

Drying Technique for Slurry for Cathode Electrode

The slurry for the cathode electrode 102 may be dried by irradiating heat, electron beams (E-beams), gamma rays, or UV (G, H, I-line), the like, or combinations thereof, to vaporize the solvent. For example, the slurry may be vacuum dried at room temperature. Although the solvent is removed through evaporation by the drying step, the other ingredients do not evaporate and remain as they are to form the cathode electrode 102.

Additional Drying Techniques

In addition to the drying techniques mentioned, the cathode electrode 102 may be dried using other methods such as infrared (IR) drying, microwave drying, or freeze-drying.

Combination of Drying Techniques

In some embodiments, a combination of drying techniques may be employed, such as using convection heating followed by vacuum drying, to optimize the drying process and ensure complete solvent removal while maintaining the integrity of the electrode structure.

Anode Electrode Generally

The anode electrode 104 is associated with one polarity (e.g., negative) of the solid state battery 100, which is different than the polarity of the cathode electrode 102. The anode electrode 104 is configured as a negative electrode during discharge of the solid state battery 100. The anode electrode 104 is suitable for lithium ion diffusion between a current collector 110 and the solid electrolyte layer 106.

Anode Electrode Positioning

The anode electrode 104 is in electrical communication with the current collector 110. In embodiments, the anode electrode 104 is formed over and in direct contact with the current collector 110. In other embodiments, another functional layer may be interposed between the anode electrode 104 and the current collector 110.

Anodeless Electrode System

In some embodiments, as explained above, the solid state battery 100 may utilize an anodeless electrode system. In such configurations, the anode electrode 104 may be omitted, and lithium metal may be deposited directly onto the current collector 110 during charging. This approach may potentially increase the energy density of the battery and eliminate a separate anode material, while also potentially reducing the overall thickness of the battery structure.

Materials for Anode Electrode

The anode electrode 104 may be capable of reversible intercalation and deintercalation of lithium ions. For example, the anode electrode 104 can comprise an anode active material alone. In other examples, the anode electrode 104 may include conductive particles, a binder, the like, or combinations thereof.

Additives for Anode Electrode

Optionally, the anode electrode 104 may further comprise an additive, such as, for example, an oxidation stabilizing agent (e.g., butylated hydroxyanisole, butylated hydroxytoluene, propyl gallate, tert-butylhydroquinone), a reduction stabilizing agent (e.g., ascorbic acid, sodium sulfite, erythorbic acid, sodium metabisulfite), a flame retardant (e.g., aluminum hydroxide, magnesium hydroxide, ammonium polyphosphate, melamine cyanurate), a heat or light stabilizer (e.g., phenolic compounds, phosphites, hindered amine light stabilizers, UV absorbers like benzophenones or benzotriazoles), an antifogging agent (e.g., polyethylene glycol, silica nanoparticles, glycerol, sorbitol), a thickener (e.g., carboxymethyl cellulose, xanthan gum), the like, or a combination thereof.

Other Additives for Anode Electrode

Additionally, conductive additives such as carbon black, graphene, or carbon nanotubes may be incorporated to enhance electrical conductivity, while binder modifiers like styrene-butadiene rubber or polyacrylic acid may improve adhesion and mechanical stability. Functional additives such as fluoroethylene carbonate or vinylene carbonate may also be included to promote the formation of a stable solid electrolyte interphase layer on the anode surface.

Materials for Anode Active Material

The anode active material is made of or includes various materials, such as, for example, an alkali earth metal, an alkaline earth metal, a group 3B metal, a transition metal, a metalloid, an alloy thereof, a conductive carbon, the like, or a combination thereof, although not limited thereof. In embodiments, the anode active material can comprise silicon, a silicon alloy, lithium, a lithium alloy, a conductive carbon, or a combination thereof, although not limited thereto. In embodiments, the lithium alloy is made of or includes a lithium alloy comprising silicon, chlorine, or a combination thereof. A lithium metal thin film may be used as the anode active material.

Other Materials Anode Active Materials

The anode active material can include carbon-based material such as artificial graphite, natural graphite, graphitized carbon fiber, amorphous carbon or the like; a metallic compound capable of alloying with lithium such as Si, Al, Sn, Pb, Zn, Bi, In, Mg, Ga, Cd, a Si alloy, a Sn alloy, an Al alloy, or the like; a metal oxide capable of doping and dedoping lithium ions such as $SiO_x$ ($0<x<2$), $SnO_2$, vanadium oxide or lithium vanadium oxide; and a composite including the metallic compound and the carbon-based material such as a Si—C composite or a Sn—C composite.

Carbon-Based Materials

The carbon-based material can include low-crystallinity carbon, high-crystallinity carbon, the like, or combinations thereof. A representative example of low-crystallinity carbon is soft carbon or hard carbon, and a representative example of the high-crystallinity carbon is high-temperature calcined carbon such as amorphous, platy, flaky, spherical or fibrous natural graphite or artificial graphite, kish graphite, pyrolytic carbon, mesophase pitch-based carbon fiber, mesocarbon microbeads, mesophase pitches, petroleum or coal tar pitch-derived coke, the like, or combinations thereof.

Metal Carbon Composite Materials

Alternatively, according to aspects of the disclosure, the anode electrode 104 may comprise an anode material with a metal carbon composite, such as a silver-carbon blend or composite, where silver particles are complexed between amorphous and/or crystalline carbon particles. Here silver is used as an example, and other metals may be used, including for example, tin and/or zinc. Silicon can be used in place of the silver.

Further Materials for Anode Active Material

In addition to the materials mentioned, the anode active material may also include titanium-based compounds such as lithium titanate (Li4Ti5O12) or titanium dioxide (TiO2), which can offer excellent cycling stability and high-rate capability. Other potential materials may include transition metal oxides like molybdenum oxides (MoOx), iron oxides (FeOx), or nickel oxides (NiOx), which can provide high theoretical capacities. In some cases, composite materials combining different active materials, such as silicon-graphite composites or tin-carbon composites, may be used to leverage the advantages of multiple materials while mitigating their individual limitations.

Dendrite Formation

When the anode electrode 104 is made of or includes lithium or a lithium alloy, dendrites may form on the anode electrode 104. The dendrites are a metallic lithium structure formed when extra lithium ions accumulate on a surface of the anode electrode 104. The formed dendrites may damage the solid electrolyte layer 106, reduce battery capacity of the solid state battery 100, and/or otherwise lead to undesired performance of the solid state battery 100. Dendrite formation is a significant challenge in lithium-based batteries, as these structures can grow through the electrolyte, potentially causing short circuits and safety hazards. The growth rate and morphology of dendrites may be influenced by factors such as current density, temperature, and the nature of the electrolyte-electrode interface.

Advantages of Solid Electrolytes in Mitigating Dendrite Formation

Solid electrolytes offer several advantages over liquid electrolytes when it comes to mitigating dendrite formation. The mechanical strength of solid electrolytes may help suppress dendrite growth by providing a physical barrier to lithium metal penetration. Additionally, the uniform ion distribution in solid electrolytes may promote more even lithium deposition, reducing the likelihood of localized dendrite nucleation. Some solid electrolytes may also form a stable interface with the lithium metal anode, further inhibiting dendrite formation. However, while solid electrolytes can significantly reduce the risk of dendrite growth, they may not completely eliminate it, and ongoing research aims to develop advanced solid electrolyte materials with enhanced dendrite suppression capabilities.

Shape of Anode Active Material

The anode active material can be particle shaped or it may be a continuous, unitary form (e.g., a thin film or sheet).

Particle Size

In embodiments where the anode active material is particle shaped, the anode active material can comprise a particle size of any number in a range from at or about 10 nm to at or about 1000 µm, such as at or about 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1000 nm, 2 µm, 3 µm, 4 µm, 5 µm, 6 µm, 7 µm, 8 µm, 9 µm, 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 510 µm, 520 µm, 530 µm, 540 µm, 550 µm, 560 µm, 570 µm, 580 µm, 590 µm, 600 µm, 610 µm, 620 µm, 630 µm, 640 µm, 650 µm, 660 µm, 670 µm, 680 µm, 690 µm, 700 µm, 710 µm, 720 µm, 730 µm, 740 µm, 750 µm, 760 µm, 770 µm, 780 µm, 790 µm, 800 µm, 810 µm, 820 µm, 830 µm, 840 µm, 850 µm, 860 µm, 870 µm, 880 µm, 890 µm, 900 µm, 910 µm, 920 µm, 930 µm, 940 µm, 950 µm, 960 µm, 970 µm, 980 µm, 990 µm, or 1,000 µm. In embodiments, particle size of the anode active material may be within a range formed by selecting any two numbers listed above or by selecting any two numbers in the range of from at or about 10 nm to at or about 1000 µm, e.g., between about 10 nm and about 1,000 µm.

Amount of Anode Active Material in Anode Electrode

The amount of the anode active material in the solid state battery 100 affects the charge and discharge capacity of the solid state battery 100. In order to manufacture a high-capacity anode electrode 104, a high level of anode active material can be included in the anode electrode 104. For example, the anode electrode 104 includes at, about, or greater than 70, 80, 90, 95, 98, 99, or 100 wt % of anode active material based on the total weight of the anode electrode 104. In embodiments, anode active material in the anode electrode 104 may be within a range formed by selecting any two numbers listed in the immediately previous sentence, e.g., between about 70 wt % and about 100 wt %.

Materials for Binder in Anode Electrode

The binder can comprise various types of binder polymers, such as, for example, polyvinylidene fluoride-co-hexafluoropropylene (PVdF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, ethylene-propylene-diene monomer (EPDM), sulfonated EPDM, styrene butadiene rubber (SBR), fluororubber, polyacrylic acid, polymers thereof whose hydrogen atoms are substituted with Li, Na or Ca, various copolymers thereof, the like, or combinations thereof.

Examples of Materials for Binder in Anode Electrode

In addition to the binders mentioned, other suitable binders for use in the anode electrode may include polyimide, polyamide-imide, polyurethane, polyethylene oxide (PEO), poly(ethylene-co-vinyl acetate) (PEVA), poly(vinyl acetate) (PVA), alginate, chitosan, guar gum, xanthan gum, carrageenan, pectin, gelatin, lignin, and various water-soluble polymers or their derivatives. In some cases, conductive polymers such as polypyrrole, polyaniline, or poly(3,4-ethylenedioxythiophene) (PEDOT) may also be used as binders to simultaneously improve adhesion and electrical conductivity within the anode electrode.

Amount of Binder in Anode Electrode

The anode electrode 104 may include at or about 0, 1, 2, 3, 4, 5, 6, 7, 8, 9, 10, 11, 12, 13, 14, 15, 17, 18, 19, 20, 21, 22, 23, 24, 25, 26, 27, 28, 29, or 30 wt %, or any other wt % in the range between 0 and 30 wt % of binder based on the total weight of the anode electrode 104. In embodiments, binder in the anode electrode 104 may be within a range formed by selecting any two numbers listed above or by selecting any two numbers in the range between 0 and 30 wt %, e.g., between about 0 wt % and about 30 wt %.

Thickness of Anode Electrode

The anode electrode 104 can have a thickness of at or about 10, 15, 20, 25, 30, 35, 40, 45, 50, 55, 60, 65, 70, 75, 80, 85, 90, 95, or 100 µm. In embodiments, the thickness, $t_4$, of the anode electrode 104 may be within a range formed by selecting any two numbers listed above or by selecting any two numbers in the range of from 10 µm to about 100 µm, e.g., between about 10 µm and about 100 µm or about 10 µm and about 20 µm.

Porosity of Anode Electrode

A porosity of the anode electrode 104 can be about 0, 1, 2, 3, 4, 5, 6, 7, 8, 9, 10, 11, 12, 13, 14, 15, 16, 17, or 18 vol %, or any other vol % in the range from 0 to 18 vol %, based on the total volume of the anode electrode 104. In embodiments, the porosity of the anode electrode 104 may be within a range formed by selecting any two numbers listed above or by selecting any two numbers in the range from between 0 vol % to about 18 vol %.

Lithium Ion Diffusivity of Anode Electrode.

The anode electrode 104 may include a lithium ion diffusivity of at or about $1\times10^{-14}$ cm$^2$/s, $1\times10^{-13}$ cm$^2$/s, $1\times10^{-12}$ cm$^2$/s, $1\times10^{-11}$ cm$^2$/s, $1\times10^{-10}$ cm$^2$/s, $1\times10^{-9}$ cm$^2$/s, $1\times10^{-8}$ cm$^2$/s, or $1\times10^{-7}$ cm$^2$/s. In embodiments, the lithium ion diffusivity of the anode electrode 104 may be within a range formed by selecting any two numbers listed above or by selecting any two numbers in the range from at or about $1\times10^{-14}$ cm$^2$/s to at or about $1\times10^{-7}$ cm$^2$/s.

Current Collector at Anode Electrode

The current collector 110 collects electrical energy generated at the anode electrode 104 and supports the anode electrode 104.

Materials for Current Collector at Anode Electrode

The material of the current collector 110 is not particularly limited as long as it allows adhesion of the anode electrode 104, has a suitable electrical conductivity, and does not cause significant chemical changes in the corresponding solid state battery 100 in the voltage range of the solid state battery 100. For example, the current collector 110 is made of or includes a metal or a conductive carbon, although not limited thereto.

Metal for Current Collector

The metal of the current collector 110 may include one or more selected from the group consisting aluminum, an aluminum alloy, copper, a copper alloy, nickel, a nickel alloy, titanium, a titanium alloy, iron, an iron alloy (e.g., steel, stainless steel), silver, a silver alloy, or a combination thereof, although not limited thereto.

Shape of Current Collector at Anode Electrode

It is possible to increase the adhesion of the anode electrode 104 to the current collector 110 by forming fine surface irregularities on the surface of the current collector 110. The current collector 110 may have various shapes, such as, for example, a film, a sheet, a foil, a net, a porous body, a foam, a non-woven web body, the like, or combinations thereof. In addition to the shapes mentioned, the current collector 110 may also be configured as a honeycomb structure, a perforated sheet, a woven or non-woven mesh, a sintered porous body, or a three-dimensional interconnected network. These various shapes can be tailored to optimize the surface area, mechanical strength, and current collection efficiency of the current collector 110.

Design of Current Collector at Anode Electrode

Furthermore, the current collector 110 may be designed to accommodate different form factors of solid state batteries, such as pouch cells, cylindrical cells, or prismatic cells, each may offer advantages in terms of packaging efficiency, thermal management, and overall battery performance.

Thickness of Current Collector at Anode Electrode

A thickness, $t_5$, of the current collector 110 can be at or about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 μm. In embodiments, the thickness, $t_5$, of the current collector 110 may be within a range formed by selecting any two numbers listed above or by selecting any two numbers in the range of from at or about 1 μm to at or about 500 μm, e.g., between about 5 μm and about 500 μm.

Manufacturing Methods for Anode Electrode

The anode electrode 104 may be obtained by various methods, such as, for example, atomic deposition, extrusion, rolling, a slurry method, or a combination thereof. In addition to the methods mentioned, the anode electrode 104 may be manufactured using various other techniques, including dry electrode processes. These alternative methods may offer advantages in terms of environmental impact, cost-effectiveness, and scalability.

Dry Powder Coating

Dry powder coating may be employed as an alternative to the slurry method. In this process, the anode active material, conductive additives, and binder are mixed in a dry state and then directly applied to the current collector 110 using electrostatic deposition or mechanical compression. This method may reduce the use of solvents, potentially reducing environmental impact and processing time.

3D Printing

Additive manufacturing techniques, such as 3D printing, may be used to fabricate the anode electrode 104. Various 3D printing methods, including fused deposition modeling (FDM), selective laser sintering (SLS), or direct ink writing (DIW), can be utilized depending on the specific materials and desired electrode properties. This approach allows for precise control over the electrode structure and porosity.

Electrospinning

Electrospinning is another potential method for manufacturing the anode electrode 104. In this process, a solution containing the anode active material, conductive additives, and a polymer binder is extruded through a nozzle under an electric field, resulting in the formation of nanofibers. These fibers can be collected directly on the current collector 110 to form a highly porous electrode structure with increased surface area.

Tape Casting

Tape casting may be employed to prepare the anode electrode 104. This technique involves spreading a slurry of electrode materials onto a moving carrier film using a doctor blade, followed by drying and calendaring. The resulting electrode tape can then be laminated onto the current collector 110.

Spray Coating

Spray coating techniques may be used to fabricate the anode electrode 104. A fine mist of the electrode slurry is sprayed onto the current collector 110 using compressed air or ultrasonic atomization. This approach may allow for the creation of thin, uniform electrode layers and can be particularly useful for large-scale production.

Freeze-Casting

Freeze-casting is another potential method for manufacturing the anode electrode 104. This process involves freezing a slurry of electrode materials, followed by sublimation of the ice to create a porous structure. The resulting porous electrode can then be sintered and attached to the current collector 110.

Sol-Gel Process

In some cases, a sol-gel process may be used to prepare the anode electrode 104. This method involves the formation of a colloidal suspension (sol) that is then converted into a gel-like network containing the anode active material and other components. The gel can be applied to the current collector 110 and subsequently heat-treated to form the final electrode structure.

Vapor Deposition

For certain applications, physical vapor deposition (PVD) or chemical vapor deposition (CVD) techniques may be employed to create thin film anodes directly on the current collector 110. These methods can produce highly uniform and dense electrode layers, which may be particularly beneficial for certain types of solid-state batteries.

Alloying and Ball Milling

Mechanical alloying and high-energy ball milling may be used to prepare composite anode materials, which can then be pressed into electrodes or applied to the current collector 110 using one of the aforementioned methods. This technique can be particularly useful for creating nanostructured or amorphous anode materials with enhanced electrochemical properties.

Slurry Method

For example, the anode active material can be mixed and agitated with a solvent, and optionally a binder, and a dispersing agent to form slurry. Then, the slurry can be applied (e.g., coated) onto the current collector 110, followed by pressing and drying, to obtain the anode electrode 104.

Application Methods for Slurry for Anode Electrode

The application of the slurry for the anode electrode 104 may include using a technique selected from the group consisting of slot die coating, gravure coating, spin coating, spray coating, roll coating, curtain coating, extrusion, casting, screen printing, inkjet printing, spray printing, gravure printing, heat transfer printing, a Toppan printing method, intaglio printing, offset printing, the like, and combinations thereof. In addition to the aforementioned techniques, other methods for applying the anode slurry to the current collector may include doctor blade coating, dip coating, and meniscus coating.

Double Slot Die Layer Coating

Double slot die layer coating may also be employed, which allows for the simultaneous application of two distinct layers of electrode materials onto the current collector in a single pass. This method can potentially enable the creation of gradient structures within the electrode, optimizing both electrochemical performance and mechanical properties.

Solvent for Slurry for Anode Electrode

The solvent for forming the anode electrode 104 may include water and/or an organic solvents, such as, for example, N-methyl pyrrolidone (NMP), dimethyl formamide (DMF), acetone, dimethyl acetamide, dimethyl sulfoxide (DMSO), isopropyl alcohol, the like, or combinations thereof. The solvent may be used in an amount sufficient to dissolve and disperse the electrode ingredients, such as the anode active material and binder, considering the slurry coating thickness, production yield, the like, or combinations thereof. Additional organic solvents that may be used include ethanol, methanol, propanol, butanol, ethyl acetate, methyl ethyl ketone, tetrahydrofuran, diethyl ether, and toluene.

Solvent-Free Methods

In some embodiments, the anode electrode 104 may be prepared using a solvent-free method, such as dry powder processing or melt extrusion, which eliminates the need for liquid solvents and may offer environmental and cost benefits.

Dispersing Agent for Slurry for Anode Electrode

The dispersing agent forming the anode electrode 104 may include an aqueous dispersing agent and/or an organic dispersing agent, such as, for example, N-methyl-2-pyrrolidone. Other examples of aqueous dispersing agents may include sodium dodecyl sulfate (SDS), polyvinylpyrrolidone (PVP), and carboxymethyl cellulose (CMC), while additional organic dispersing agents may include Triton X-100, polyethylene glycol (PEG), and various surfactants such as polysorbates or poloxamers.

Methods without a Dispersing Agent

In some embodiments, the anode electrode 104 may be prepared using methods that do not require a dispersing agent, such as dry powder processing or certain additive manufacturing techniques.

Drying Technique for Slurry for Anode Electrode

The slurry for the anode electrode 104 may be dried by irradiating heat, electron beams (E-beams), gamma rays, or UV (G, H, I-line), the like, or combinations thereof, to vaporize the solvent. For example, the slurry may be vacuum dried at room temperature. Although the solvent is removed through evaporation by the drying step, the other ingredients do not evaporate and remain as they are to form the anode electrode 104.

Other Drying Techniques

In addition to the drying techniques mentioned, several other methods may be employed to dry the anode electrode slurry. These additional techniques can offer various advantages depending on the specific materials, production requirements, and desired electrode properties.

Infrared (IR) Drying

Infrared (IR) drying may be used to rapidly heat the electrode surface, promoting efficient solvent evaporation. This method can be particularly effective for thin electrode coatings and may allow for precise control of the drying process.

Microwave Drying

Microwave drying is another option that can provide volumetric heating of the electrode material, potentially leading to more uniform drying throughout the electrode thickness. In some cases, a combination of convection and microwave drying may be employed to optimize both drying speed and uniformity.

Freeze-Drying

Freeze-drying, also known as lyophilization, may be utilized for certain electrode formulations. This process involves freezing the slurry and then sublimating the solvent under vacuum conditions. Freeze-drying can help maintain the porous structure of the electrode, which may be beneficial for electrolyte penetration and ion transport.

Supercritical CO2 Drying

Supercritical $CO_2$ drying is an advanced technique that may be employed for specialized electrode materials. This method involves replacing the solvent with liquid $CO_2$, which is then brought to its supercritical state and vented. This approach can help preserve delicate nanostructures within the electrode and may be particularly useful for aerogel-based electrodes.

Two-Step Drying

In some cases, a two-step drying process may be employed. For example, initial drying may be performed at a lower temperature to remove bulk solvent, followed by a higher temperature step to remove residual solvent and potentially initiate any desired chemical reactions within the electrode material.

Ultrasonic Drying

Ultrasonic drying may also be considered for certain electrode formulations. This technique uses high-frequency sound waves to agitate the solvent molecules, potentially accelerating the drying process and improving solvent removal from porous structures within the electrode.

Solid Electrolyte Layer Generally

The solid electrolyte layer 106 is suitable for lithium ion diffusion between the cathode electrode 102 and the anode electrode 104. The solid electrolyte layer 106 provides an electrically conductive pathway for the movement of charge carriers between the cathode electrode 102 and the anode electrode 104. The solid electrolyte layer 106 is in electrical communication with the cathode electrode 102 and the anode electrode 104.

Solid Electrolyte Positioning

In embodiments, the solid electrolyte layer 106 is formed over and in direct contact with the cathode electrode 102 or the anode electrode 104. In embodiments, the solid electrolyte layer 106 is in direct contact with the cathode electrode 102 and the anode electrode 104. In other embodiments, another functional layer may be interposed between the solid electrolyte layer 106 and the cathode electrode 102 and/or the anode electrode 104.

Materials for Solid Electrolyte Layer

The solid electrolyte layer 106 may be capable of transport of lithium ions. The material of the solid electrolyte layer 106 is not particularly limited as long as it allows adhesion with adjacent layers, has a suitable electrical conductivity, and does not cause significant chemical changes in the corresponding solid state battery 100 in the voltage range of the solid state battery 100. For example, the solid electrolyte layer 106 may include various inorganic solid electrolytes, polymer solid electrolytes, and/or polymer gel electrolytes, although not limited thereto. Additionally or alternatively, the solid electrolyte layer 106 may include ceramic electrolytes, glass electrolytes, hybrid organic-inorganic electrolytes, and nanostructured electrolytes, although not limited to these categories.

Inorganic Solid Electrolyte

The inorganic solid electrolyte may include a crystalline solid electrolyte, a non-crystalline solid electrolyte, a glass ceramic solid electrolyte, the like, or a combination thereof, although not limited thereto. The inorganic solid electrolyte may be sulfide-based, oxide-based, the like, or a combination thereof. In addition to sulfide-based and oxide-based inorganic solid electrolytes, other types of inorganic solid electrolytes may include halide-based electrolytes, nitride-based electrolytes, and borate-based electrolytes. For example, lithium-rich anti-perovskites (LiRAP) such as Li3OCl and Li3OBr, lithium nitride (Li3N), and lithium borohydride (LiBH4) have been investigated as potential solid electrolyte materials for lithium-ion batteries.

Sulfide Based Solid Electrolyte

The sulfide-based solid electrolyte includes sulfur(S) and has ionic conductivity of metal belonging to Group I or Group II of the periodic table, and may include Li—P—S-based glass or Li—P—S-based glass ceramics.

Examples of Sulfide-Based Solid Electrolyte

For example, the sulfide-based solid electrolyte may include lithium sulfide, silicon sulfide, germanium sulfide and boron sulfide. Particular examples of the inorganic solid electrolyte may include $Li_{3.833}Sn_{0.833}As_{0.166}S_4$, $Li_4SnS_4$, $Li_{3.25}Ge_{0.25}P_{0.75}S_4$, $Li_2S—P_2S_0$, $B_2S_3—Li_2S$, $XLi_2S-(100-x)P_2S_5$ (x=70-80), $Li_2S—SiS_2—Li_3N$, $Li_2S—P_2S_5—LiI$, $Li_2S—SiS_2—LiI$, $Li_2S—B_2S_3—LiI$, $Li_3N$, LISICON, LIPON $(Li_{3+y}PO_{4-x}N_x)$, thio-LISICON $(Li_{3.25}Ge_{0.25}P_{0.75}S_4)$, $Li_2O—Al_2O_3—TiO_2—P_2O_5$ (LATP), $Li_2S—P_2S_5$, $Li_2S—LiI—P_2S_5$, $Li_2S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SnS$, $Li_2S—P_2S_5—Al_2S_3$, $Li_2S—GeS_2$, $Li_2S—GeS_2—ZnS$, $Li10GeP2S12$ (LGPS), $Li7P3S11$, $Li6PS5Cl$, $Li6PS5Br$, $Li6PS5I$, $Li9.54Si1.74P1.44S11.7C10.3$, $Li11Si2PS12$, the like, or combinations thereof.

Doped Variants

In some cases, doped variants of these materials, such as Al-doped $Li10GeP2S12$ or Sb-doped $Li6PS5Cl$, may also be employed to further enhance ionic conductivity or stability.

Oxide Based Solid Electrolyte

The oxide-based solid electrolyte material contains oxygen (O) and has ionic conductivity of metal belonging to Group I or II of the periodic table.

Examples of Oxide-Based Solid Electrolyte Material

The oxide-based solid electrolyte material may include at least one selected from the group consisting of LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $LigSiA_1O_8$, LAGP-based compounds, LATP-based compounds, $Li_{1+x}Ti_{2-x}Al_xSi_y(PO_4)_{3-y}$ (0≤x≤1, 0≤y≤1), $LiAl_xZr_{2-x}(PO_4)_3$ (0≤x≤1, 0≤y≤1), $LiTi_xZr_{2-x}(PO_4)_3$ (0≤x≤1, 0≤y≤1), LISICON-based compounds, LIPON-based compounds, perovskite-based compounds, NASICON-based compounds and LLZO-based or derived compounds (such as Al-doped Li7La3Zr2O12 and Ta-doped Li7La3Zr2O12). Lithium-rich anti-perovskites like Li3OCl and Li3OBr have also been investigated as potential oxide-based solid electrolytes.

Composite Oxide Electrolyte

In some cases, composite oxide electrolytes combining multiple oxide materials, such as LLZO-LATP composites, may be employed to leverage the advantages of different oxide systems.

Polymer Solid Electrolyte

The polymer solid electrolyte is a composite of electrolyte salt with polymer resin and has lithium ion conductivity. The polymer solid electrolyte may include a polyether polymer, a polycarbonate polymer, an acrylate polymer, a polysiloxane polymer, a phosphazene polymer, a polyethylene derivative, an alkylene oxide derivative, a phosphate polymer, a polyagitation lysine, a polyester sulfide, a polyvinyl alcohol, a polyvinylidene fluoride, a polymer containing an ionically dissociable group, poly(ethylene imine) (PEI), poly(methyl methacrylate) (PMMA), poly(acrylonitrile) (PAN), poly(ethylene succinate) (PES), biopolymers such as chitosan and cellulose derivatives, the like, or combinations thereof.

Polymer Resin for the Solid Polymer Electrolyte

The solid polymer electrolyte may include a polymer resin, such as a branched copolymer including polyethylene oxide (PEO) backbone copolymerized with a comonomer including an amorphous polymer, such as, for example, PMMA, polycarbonate, polydiloxane (pdms) and/or phosphazene, comb-like polymer, crosslinked polymer resin, polyethylene glycol (PEG), polypropylene oxide (PPO), polyacrylonitrile (PAN), poly(methyl methacrylate) (PMMA), poly(vinylidene fluoride-co-hexafluoropropylene) (PVDF-HFP), poly(ethylene oxide-co-propylene oxide) (PEO-PPO), poly(ethylene imine) (PEI), poly(vinyl pyrrolidone) (PVP), poly(vinyl alcohol) (PVA), various block copolymers or graft copolymers incorporating these materials, the like, or combinations thereof.

Polymer Gel Electrolyte

The polymer gel electrolyte can be formed by incorporating an organic electrolyte containing an organic solvent and an electrolyte salt, an ionic liquid, monomer, or oligomer to a polymer resin, the like, or combinations thereof. The polymer resin for the polymer gel can include polyether polymers, PVC polymers, PMMA polymers, polyacrylonitrile (PAN), polyvinylidene fluoride (PVDF), poly(vinylidene fluoride-co-hexafluoropropylene: PVDF-co-HFP), the like, or combinations thereof.

Examples of Polymer Gel Electrolyte

Examples of polymer gel electrolytes that may be suitable for solid state batteries include poly(ethylene oxide) (PEO), poly(methyl methacrylate-co-ethyl acrylate) (PMMA-EA), poly(acrylonitrile-co-methyl methacrylate) (PAN-MMA), poly(vinyl acetate) (PVAc), poly(ethylene glycol diacrylate) (PEGDA), poly(vinyl pyrrolidone) (PVP), poly(ethylene glycol methyl ether acrylate) (PEGMEA), poly(ethylene glycol methyl ether methacrylate) (PEGMEMA), poly(ionic liquid) (PIL), poly(ethylene glycol-co-propylene glycol) (PEG-PPG), poly(vinyl alcohol-co-ethylene) (PVA-PE), poly(acrylamide) (PAM), poly(2-hydroxyethyl methacrylate) (PHEMA), poly(ethylene glycol-co-polyethylene oxide) (PEG-PEO), and poly(methacrylic acid) (PMAA) based gel electrolytes to optimize the electrochemical and physical properties of the solid electrolyte.

Electrolyte Salt

The electrolyte salt is an ionizable lithium salt and may be represented by $Li^+X^-$. $X^-$ may include an anion selected from the group consisting of $F^-$, $Cl^-$, $Br^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2$ $H^-$, $CF_3(CF_2)_7SO_3^-$, $CF_3CO_2^-$, $CH_3CO_2^-$, $SCN^-$, $(CF_3CF_2SO_2)_2N^-$, and the like.

Examples of Lithium Salt

For example, the lithium salt may be any one selected from the group consisting of LiTFSI, LiCl, LiBr, LiI, $LiClO_4$, lithium tetrafluoroborate ($LiBF_4$), $LiB_{10}Cl_{10}$, lithium hexafluorophosphate ($LiPF_6$), $LiAsF_6$, $LiSbF_6$, $LiAlCl_4$, LiSCN, $LiCF_3CO_2$, $LICH_3SO_3$, $LiCF_3SO_3$, LiN $(SO_2CF_3)_2$, $LiN(SO_2C_2F_5)_2$, $LiC_4F_9SO_3$, $LiC(CF_3SO_2)_3$, $(CF_3SO_2)_2NLi$, lithium chloroborate, lithium lower aliphatic carboxylate, lithium imide 4-phenylborate, lithium bis(oxalato) borate (LiBOB), lithium difluoro (oxalato) borate (LiDFOB), lithium bis(fluorosulfonyl)imide (LiFSI), lithium 4,5-dicyano-2-(trifluoromethyl) imidazolide (LiTDI), lithium bis(trifluoromethanesulfonyl)imide (LiTFSI), and lithium bis(fluorosulfonyl)imide (LiFSI), the like, and combinations thereof. The electrolyte salt can include any combination of the salts described herein.

Amount of Electrolyte Salt

The solid electrolyte layer 106 can include at or about 0, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 parts, all based on the total weight of the solid electrolyte layer 106. In embodiments, electrolyte salt in the solid electrolyte layer 106 may be within a range formed by selecting any two numbers listed above or by selecting any two numbers between about 0 parts and about 400 parts, or about 60 parts and 400 parts, based on the total weight of the solid electrolyte layer 106.

Ion Conductivity of Solid Electrolyte Layer

The solid electrolyte layer 106 may have a suitable reduction stability and/or ion conductivity. Since the solid electrolyte layer 106 mainly functions to transport lithium ions between electrodes, the solid electrolyte layer 106 can include a desirable ion conductivity of at, about, or greater than, for example, $10^{-7}$ S/cm, $10^{-6}$ S/cm, $10^{-5}$ S/cm, or $10^{-4}$ S/cm.

Thickness of Solid Electrolyte Layer

A thickness, $t_6$, of the solid electrolyte layer 106 can be at or about 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850,860, 870, 880, 890, 900, 910, 920, 930, 940, 950, 960, 970, 980, 990, or 1,000 µm. In embodiments, the thickness, to, of the solid electrolyte layer 106 may be within a range formed by selecting any two numbers listed above or by selecting any two numbers in the range of between 0 and at or about 1,000 µm, e.g., between about 5 µm and about 1,000 µm, about 30 µm and about 100 µm, or about 30 µm and about 50 µm.

Unfinished Product

The cell 101 as shown in FIG. 1 can be provided as an unfinished product. In embodiments, the cell 101 is stored, transported, and/or delivered to a reseller, customer, or the like that finishes manufacture of a battery assembly or product comprising the cell 101. In other embodiments, the cell 101 is a finished battery assembly or product.

Sealing Battery

An enclosure 112 of the solid state battery can be sealed to finish making the solid state battery 100 such that it will work as a battery. The sealing process may involve various techniques to ensure the internal components are protected from external environmental factors and to maintain the integrity of the battery structure. For example, the enclosure 112 may be hermetically sealed using methods such as laser welding, ultrasonic welding, or adhesive bonding. In some cases, the sealing process may also include the introduction of a protective atmosphere or the removal of air to create a vacuum within the enclosure. This sealing step may be helpful for preventing moisture ingress, which could potentially degrade the performance of the sulfide-based solid electrolyte. Additionally, the sealing process may incorporate safety features such as pressure relief mechanisms to manage any potential gas build-up during battery operation.

After Sealing Battery

Once properly sealed, the solid state battery 100 is ready for final quality control checks, which may include electrical testing, leak detection, and visual inspections. After passing these checks, the solid state battery 100 could be packaged and sold as a finished product, ready for integration into various electronic devices, electric vehicles, energy storage systems (e.g., an energy storage system for storing power generated by a wind generator and/or a solar power generator), and so forth.

Battery Configuration

The solid state battery 100 is provided in various configurations to suit different applications and device requirements. In some aspects, the battery may be manufactured in a cylindrical form, which can be advantageous for certain types of portable electronics or automotive applications. Alternatively, the solid state battery 100 may be produced in a prismatic form, which can allow for more efficient space utilization in devices with rectangular form factors. In other cases, a pouch form may be employed, offering flexibility in shape and potentially reducing overall battery weight. The pouch form may further be especially suitable for solid state batteries due to easier application and control of uniform pressures within the battery.

Choice of Configuration

The choice of configuration may depend on factors such as the intended use, space constraints, thermal management requirements, and manufacturing considerations. In some embodiments, hybrid or custom configurations combining elements of different forms may be utilized as desired. The versatility in battery form factors can enable the integration of solid state batteries into a wide range of products, from small wearable devices to large-scale energy storage systems.

Voltage

The solid state battery 100 is configured to output a voltage of at or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 48, 50, 55, 60, 65, 70, 75, 80, 85, 90, 95, 96, 100, 110, 120, 130, 140, 150, 160, 170, 180, 190, 200, 210, 220, 230, 240, 250, 260, 270, 280, 290, 300, 310, 320, 330, 340, 350, 360, 370. 380, 390, 400, 410, 420, 430, 440, 450, 460, 470, 480, 490, or 500 V. In embodiments, the output voltage of the solid state battery 100 may be within a range formed by selecting any two numbers listed above or by selecting any two numbers in the range of between 0 and at or about 500 V, e.g., between about 1 V DC and about 500 V DC.

Capacity

The solid state battery 100 may be configured to have a capacity of at, about, or greater than 100, 110, 120, 130, 140, 150, 160, 170, 180, 190, 200, 210, 220, 230, 240, 250, 260, 270, 280, 290, or 300 mAh/g. In embodiments, the output voltage of the solid state battery 100 may have a capacity formed by selecting any two numbers listed above or by selecting any two numbers in the range of between 0 and 300 mAh/g or between 0 and about 300 mAh/g, e.g., between about 100 mAh/g and about 300 mAh/g.

Volume Expansion Calculation

The solid state battery 100 may be configured to have a desirable volume expansion rate. The volume expansion rate may be calculated from a change in thickness after the first cycle of charging and discharging compared to the initial thickness. The volume expansion rate may be a ratio of the thickness change to the initial thickness. A first cycle of charging and discharging is performed by CC-CV charging a battery at 0.1 C and cutting off at 4.25 to 4.4 V and 0.02 C, and CC discharging the battery at 0.1 C and cutting off at 3 V. The volume expansion rate is calculated by Equation 1 below in which A may represent a thickness before charging and discharging and B may represent a thickness after charging and discharging. The thickness may be measured using a Mauser micrometer or a scanning electron microscope (SEM).

$$\text{Volume expansion rate} = \left[(B - A)/A\right] \times 100 \qquad \text{Equation 1}$$

C-Rate

C-rate as used herein refers to the rate at which the battery is discharged relative to its maximum capacity. For example, a 1C rate means the discharge current will discharge the entire battery within one hour. That is, for a battery with a capacity of 20 Amp-hrs, a discharge current at a 1 C would be 20 Amps.

C-Rate of the Battery

The solid state battery 100 can comprise a C-rate of at, about, or greater than 0.33, 0.4, 0.5, 0.6, 0.7, 0.8, 0.9, 1, 2, 3, 4, or 5. In embodiments, the C-rate of the solid state battery 100 can be within a range formed by selecting any two numbers listed in the immediately previous sentence, e.g., between about 0.33 and about 5.

Other Examples for Volumetric Expansion

Other ways to measure and calculate the volume expansion rate for a solid state battery may include using volumetric expansion measurement (e.g., gas pycnometry), in-situ dilatometry, X-ray tomography, strain gauge measurements, optical methods (e.g., digital image correlation or laser interferometry), pressure-based methods, and electrochemical strain microscopy.

Conflicts

The additional features, embodiments and examples discussed below will be applicable to various aspects of the invention discussed above. In case there is a conflict between information in the foregoing discussions and information in the following discussions, however, the information in the foregoing section should apply.

Absence of Carbon-Base Particles, Sulfur-Based Particles, and Oxide-Based Particles The anode active material does not include carbon-based particles, sulfur-based particles, or oxide-based particles.

For example, the anode electrode 104 can be substantially free of carbon-based particles, sulfur-based particles, or oxide-based particles. Carbon-based particles, sulfur-based particles, or oxide-based particles can occupy space in an anode while minimally, if at all, contributing to the capacity of the battery thereby reducing energy capacity. Carbon-based particles, sulfur-based particles, or oxide-based particles can reduce contact between particles within the cell of the battery, which can require a substantially higher pressure to be applied to the solid state battery than one that would be required in the absence of the carbon-based particles, sulfur-based particles, or oxide-based particles in the anode.

Nature of the Anode Active Material

The anode active material can be particle shaped. For example, the anode active material can comprise, consist essentially of, or consist of first particles and second particles. The first particles and the second particles can individually form discrete domains in the anode electrode 104 as opposed to forming a combined domain (e.g., where the first particles comprise silicon and the second particles comprise a material, a domain comprising silicon and the material). For examples, referring to the detailed view in FIG. 1, first particles 114 form discrete domains from second particles 116.

Amount of Anode Active Material in the Anode Electrode

The amount of the anode active material in the solid state battery 100 affects the charge and discharge capacity of the solid state battery 100. In order to manufacture a high-capacity anode electrode 104, a high level of anode active material can be included in the anode electrode 104. For example, the anode electrode 104 includes at, about, or greater than 70, 80, 90, 95, 98, 99, or 100 wt % of anode active material based on the total weight of the anode electrode 104. In embodiments, anode active material in the anode electrode 104 may be within a range formed by selecting any two numbers listed in the immediately previous sentence, e.g., between about 70 wt % and about 100 wt %.

Total Amount of First Particles and Second Particles in Anode Active Material

The anode active material can comprise at least about or about 50%, 60%, 70%, 80%, 90%, 95%, or 99% first particles and second particles based on the total weight of the anode active material. In embodiments, the amount of first particles and second particles in the anode active material may be within a range formed by selecting any two numbers listed in the immediately previous sentence, e.g., between about 50% and about 99% based on the total weight of the anode active material.

Amount of First Particles

In embodiments, the anode active material can comprise about 10, 20, 30, 40, 50, 60, 70, 80, or 90 wt %, of the first particles based on the total weight of the anode active material. In embodiments, the amount of first particles in the anode active material may be within a range formed by selecting any two numbers listed in the immediately previous sentence, e.g., between about 10% and about 90%, about 10% and about 20%, or about 40% to about 60% based on the total weight of the anode active material.

Amount of Second Particles

In embodiments, the anode active material can comprise about 10, 20, 30, 40, 50, 60, 70, 80, or 90 wt %, of the second particles based on the total weight of the anode active material. In embodiments, the amount of second particles in the anode active material may be within a range formed by selecting any two numbers listed in the immediately previous sentence, e.g., between about 10% and about 90%, about 10% and about 20%, or about 40% to about 60% based on the total weight of the anode active material. In embodiments, the anode active material can comprise more first particles than second particles based on the total weight of the anode active material.

Advantages of the Materials of the First Particles and the Second Particles

The anode active material is made of or includes various materials, such as, for example, an alkali earth metal, an alkaline earth metal, a group 3B metal, a transition metal, a metalloid, an alloy thereof, or a combination thereof, although not limited thereof. The first particles and the second particles can comprise different materials. For example, the second particles can be substantially softer than the first particles and configured to compensate for size changes of the first particles during charging and discharging cycles of the solid state battery. For example, as the first particles expand in size, the second particles are compressed in size at a given pressure applied to the solid state battery. As the first particles shrink in size, the second particles can expand in size at a given pressure applied to the solid state battery. The second particles can generally maintain contact with one another and further with the first particles directly or indirectly, which allows the solid state battery to operate at a substantially lower pressure applied thereto than one that would be required in the absence of the second particles in the anode.

Material for the First Particles

The material of the first particles may be capable of reversible intercalation and deintercalation of lithium ions. The first particles in the anode active material can comprise, consist essentially of, or consist of silicon.

Material for the Second Particles

The material of the second particles may be capable of reversible intercalation and deintercalation of lithium ions. The second particles in the anode active material can comprise a first material compound capable of alloying with lithium. The first material compound can comprise, consist essentially of, or consist of a metal or metal alloy, such as, for example, tin, a tin alloy, copper, a copper alloy, aluminum, an aluminum alloy, magnesium, a magnesium alloy, zinc, a zinc alloy, silver, a silver alloy, gold, a gold alloy, lead, a lead alloy, indium, an indium alloy, or the like, or a combination thereof, although not limited thereto. In embodiments, the second particles can comprise, consist essentially of, or consist of tin or a tin alloy. The second particles can be substantially free of lithium at the time of assembly of the battery before initial charging and discharging. For example, the second particles can comprise no greater than 0.1% lithium by weight based on the total weight of the second particles at the time of assembly of the battery before initial charging and discharging.

Example Material for the Second Particles

The second particles in the anode active material can comprise a tin-lithium alloy. A weight concentration of tin in the tin-lithium alloy is greater than a weight concentration of lithium in the tin-lithium alloy. For example, a weight concentration of the tin in the tin-lithium alloy can be at least 1% by weight greater than a weight concentration of the lithium in the tin-lithium alloy, such as, for example, at least 2% by weight greater, at least 5% by weight greater, at least 10% by weight greater, or at least 20% by weight greater than a weight concentration of the lithium in the tin-lithium alloy. In embodiments, a weight concentration of lithium in the tin-lithium alloy is configured to change based on the charging status of the solid state battery.

32

Hardness of the First Particles

The first particles can be substantially harder than the first particles. For example, the first particles can have a first hardness of about 6, 6.5, 7, 7.5, or 8 Mohs hardness values. In embodiments, the first hardness of the first particles may be within a range formed by selecting any two numbers listed in the immediately previous sentence, e.g., between about 6 and about 8 Mohs hardness values.

Hardness of the Second Particles

The second particles can be substantially softer than the first particles. For example, the second particles can have a second hardness of about 1, 1.25, 1.5, 1.75, 2, 3, or 4 Mohs hardness values. In embodiments, the second hardness of the second particles may be within a range formed by selecting any two numbers listed in the immediately previous sentence, e.g., between about 1 and about 4 Mohs hardness values.

Comparison of Hardness

To compensate for size changes of the first particles during charging and discharging cycles of the solid state battery, the second hardness can be at least, at, or about 2, 3, 4, 4.5, 5, or 5.5 Mohs hardness values less than the first hardness. In embodiments, the second hardness of the second particles can be a hardness values less than the first hardness within a range formed by selecting any two numbers listed in the immediately previous sentence, e.g., between about 2 and about 5.5 Mohs hardness values less.

Particle Size of the Anode Active Material

The anode active material can comprise particle size of at or about 10 nm, 20 nm, 30 nm, 50 nm, 70 nm, 100 nm, 200 nm, 300 nm, 400 nm, 500 nm, 1,000 nm, 10 μm, 20 μm, 30 μm, 50 μm, 70 μm, 100 μm, 200 μm, 300 μm, 400 μm, 500, or 1,000 μm. In embodiments, particle size of the anode active material may be within a range formed by selecting any two numbers listed in the immediately previous sentence, e.g., between about 10 nm and about 1,000 μm or about 100 nm to about 500 μm. The particle size of the first particles can be the same or different than the particle size of the second particles in the anode active material.

Advantageous of Differing Particles Sizes

In embodiments where the first particles have a different particle size than the second particles, the second particles and the first particles can form a bimodal distribution in the anode electrode 104. The bimodal distribution can be configured to reduce porosity of the anode electrode 104 as the second particles are positioned in void space in a lattice of the first particles. The bimodal distribution can increase surface contact during charging and discharging cycles of the solid state battery 100 such that the second particles generally maintain contact with one another and further with the first particles directly or indirectly. Thereby, the solid state battery 100 can operate at a substantially lower pressure applied thereto than one that would be required in the absence of the bimodal distribution in the anode electrode 104. In embodiments, there may be additional particles forming greater than a bimodal distribution in the anode electrode 104.

Particle Size of the First Particles

The first particle can comprise particle size of at or about 10 μm, 20 μm, 30 μm, 50 μm, 70 μm, 100 μm, 200 μm, 300 μm, 400 μm, 500, or 1,000 μm. In embodiments, particle size of the first particles may be within a range formed by selecting any two numbers listed in the immediately previous sentence, e.g., between about 10 μm and about 1,000 μm or about 10 μm and about 500 μm.

Particle Size of the Second Particles

The second particles can comprise particle size of at or about 10 nm, 20 nm, 30 nm, 50 nm, 70 nm, 100 nm, 200 nm, 300 nm, 400 nm, 500 nm, or 1,000 nm. In embodiments, particle size of the second particles may be within a range formed by selecting any two numbers listed in the immediately previous sentence, e.g., between about 10 nm and about 1,000 nm. In embodiments, the particle size of the second particles is less than half of the particle size of the first particles, such as, for example, at least 10 times less, at least 100 times less, or at least 200 times less than the particle size of the first particles.

Enhance Thickness Stability of the Anode Electrode

In embodiments, the thickness, $t_4$, of the anode electrode 104 can change less than 10%, 5%, 2%, 1%, or 0% during the charging and discharging cycles at a given pressure (e.g., 10 MPa or less, 8 MPa or less, 5 MPa or less) applied to the solid state battery. In embodiments, the thickness, $t_4$, of the anode electrode 104 may change within a range formed by selecting any two numbers listed in the immediately previous sentence, e.g., between about 0% and about 10%.

Porosity of the Anode Electrode

A porosity of the anode electrode 104 can be about 0, 1, 2 3, 4, 5, 6, 7, 8, 9, 10, 11, 12, 13, 14, 15, 16, 17, 18, 19, 20, 22, 25, 27, or 30 vol % based on the total volume of the anode electrode 104. In embodiments, the porosity of the anode electrode 104 may be within a range formed by selecting any two numbers listed in the immediately previous sentence, e.g., between 0 vol % and about 30 vol % or about 10 vol. % to about 30 vol. %.

Pressure Applied to the Battery

The layers of the solid state battery 100 can be under a pressure of at or about 1 MPa, 2 MPa, 3 MPa, 4 MPa, 5 MPa, 6 MPa, 7 MPa, 8 MPa, 9 MPa, or 10 MPa. In embodiments, the layers of the solid state battery 100 can be within a range formed by selecting any two numbers listed in the immediately previous sentence, e.g., between about 1 MPa and about 10 MPa or 1 MPa and 5 MPa. For example, the anode can be under a pressure in a range of about 1 MPa and about 10 MPa or 1 MPa and 5 MPa.

Method for Use of the Solid State Battery

A method of using the solid state battery is provided. The method comprises repeatedly charging and discharging the solid state battery. The anode is in direct contact with the solid electrolyte and the direct contact is substantially maintained after the charging and discharging by compensating for size changes of the first particles by using the second particles.

Method of Manufacture of the Solid State Battery

A method of manufacturing a cell of a solid state battery is provided. The method comprises depositing a cathode layer and depositing a solid electrolyte layer. The method comprises combining first particles and second particles to form a mixture. The method comprises depositing the mixture in an anode layer such that the second particles are configured to compensate for size changes of the first particles during charging and discharging cycles of the solid state battery. As the first particles expand in size, the second particles are compressed in size at a given pressure applied to the solid state battery. As the first particles shrink in size, the second particles expand in size at a given pressure applied to the solid state battery, whereby the second particles generally maintain contact with one another and further with the first particles directly or indirectly, which allows the solid state battery to operate at a substantially lower pressure applied thereto than one that would be required in the absence of the second particles in the anode layer. The method comprises configuring the solid state battery such that the solid electrolyte layer is positioned intermediate the cathode layer and the anode layer in order to enable transport of lithium ions between the cathode layer and the anode layer.

EXAMPLES

Examples will be described more fully hereinafter so that the present disclosure can be understood with case. However, the following examples are for illustrative purposes only and the scope of the present disclosure is not limited thereto.

Manufacturing Procedure for Examples

A cathode active material, a solid-state electrolyte, and an electron conducting agent were shear-mixed by mortar and pestle to prepare a cathode composite. In a 10 mm die, solid-state electrolyte powders were spread and pressed at 300 MPa to form a separator layer. For the anode electrode, a slurry was formed by mixing anode particles with a desired ratio of N-Methyl-2-pyrrolidone as a solvent and polyvinylidene as a binder. The slurry was cast on a copper current collector and dried under vacuum at 80 degrees Celsius. Afterward, the cathode composite power was spread on a first side of the separator layer, and the anode electrode was placed on a second side of the separator layer. The three layers (cathode-separator-anode) were then pressed at 500 MPa to assemble a cell.

First Example

A first example of a solid state battery comprising an anode active material comprising 50% by weight first particles comprising silicon and 50% by weight second particles comprising tin was tested for specific capacity under an applied pressure of 75 MPa.

Second Example

A second example of a solid state battery comprising an anode active material comprising 50% by weight first particles comprising silicon and 50% by weight second particles comprising tin was tested for specific capacity under an applied pressure of 5 MPa.

Third Example

A third example of a solid state battery comprising an anode active material comprising 100% by weight particles comprising tin was tested for specific capacity under an applied pressure of 75 MPa.

Fourth Example

Figure 2:
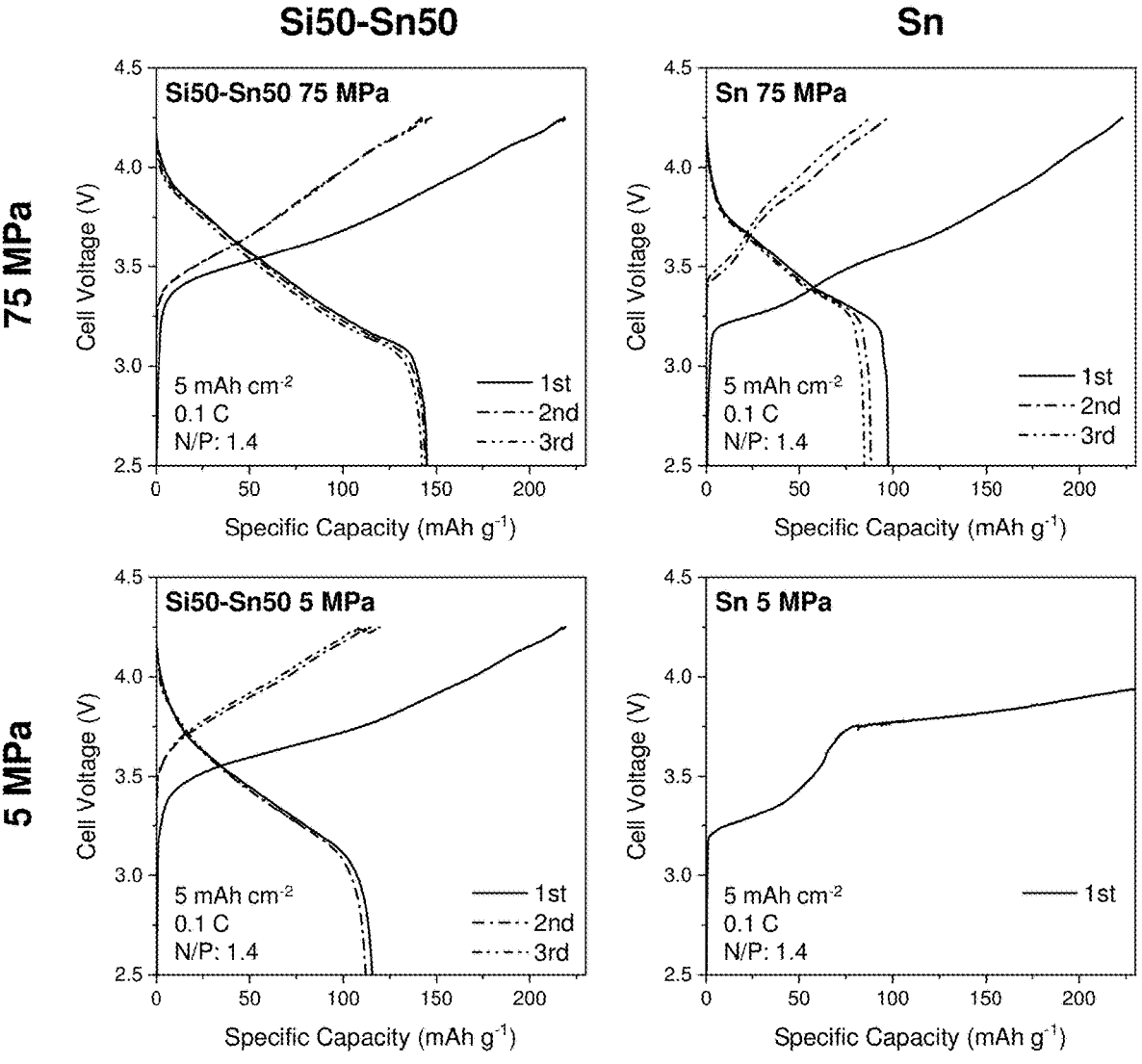
FIG. 2 is graphs of examples of solid state battery apparatus according to the present disclosure.

A fourth example of a solid state battery comprising an anode active material comprising 100% by weight particles comprising tin was tested for specific capacity under an applied pressure of 5 MPa. The results of the first, second, third, and fourth examples are shown in FIG. 2.

Fifth Example

A fifth example of a solid state battery comprising an anode active material comprising 100% by weight particles comprising tin was tested for specific capacity under an applied pressure of 5 MPa.

Sixth Example

A sixth example of a solid state battery comprising an anode active material comprising 80% by weight first particles comprising silicon and 20% by weight second particles comprising tin tested for specific capacity under an applied pressure of 5 MPa.

Seventh Example

A seventh example of a solid state battery comprising an anode active material comprising 50% by weight first particles comprising silicon and 50% by weight second particles comprising tin was tested for specific capacity under an applied pressure of 5 MPa.

Eighth Example

Figure 3:
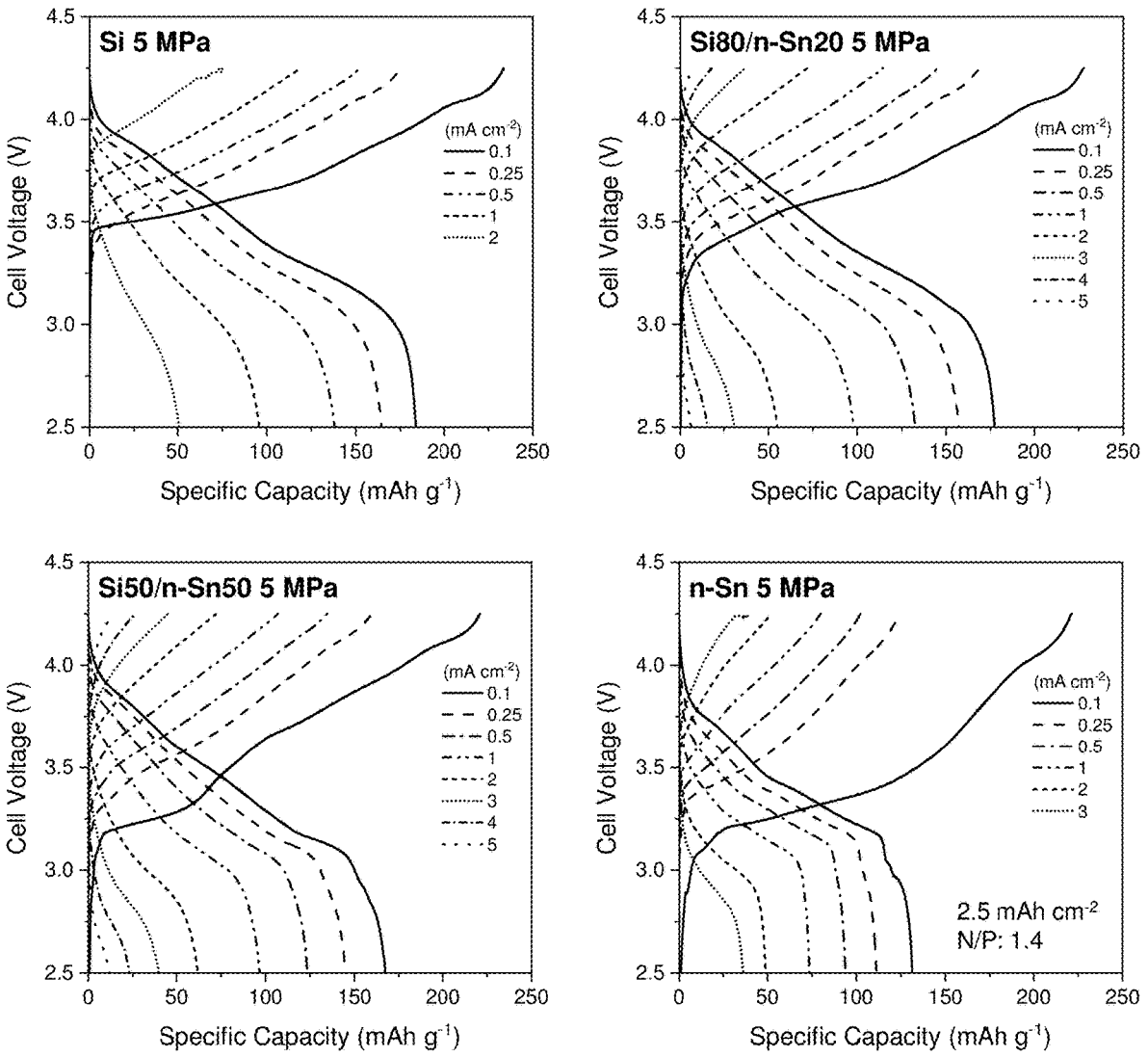
FIG. 3 is graphs of examples of solid state battery apparatus according to the present disclosure.

An eighth example of a solid state battery comprising an anode active material comprising 100% by weight particles comprising tin was tested for specific capacity under an applied pressure of 5 MPa. The results of the fifth, sixth, seventh, and eighth examples are shown in FIG. 3.

Combinations and Characteristics Included

Various features and characteristics are described in this specification to provide an understanding of the composition, structure, production, function, and/or operation of the present disclosure, which includes the disclosed compositions, coatings, and methods. It is understood that the various features and characteristics of the present disclosure described in this specification can be combined in any suitable manner, regardless of whether such features and characteristics are expressly described in combination in this specification. The Inventors and the Applicant expressly intend such combinations of features and characteristics to be included within the scope of the present disclosure described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

INCORPORATED BY REFERENCE

Any patent, publication, or other document identified in this specification is incorporated by reference into this specification in its entirety unless otherwise indicated but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification but that conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with the written description, sufficiency of description, and added matter requirements.

ILLUSTRATION OF VARIOUS ASPECTS

While the present disclosure provides descriptions of various specific aspects for the purpose of illustrating various aspects of the present disclosure and/or its potential applications, it is understood that variations and modifications will occur to those skilled in the art. Accordingly, the present disclosure herein should be understood to be at least as broad as claimed and not as more narrowly defined by particular illustrative aspects provided herein.

What is claimed is:

1. A solid state battery comprising a cell which comprises:
a cathode electrode;
an anode electrode comprising an anode active material:
   first particles comprising silicon, and
   second particles comprising a tin-lithium alloy, wherein
      a weight concentration of tin in the tin-lithium alloy
      is greater than a weight concentration of lithium in
      the tin-lithium alloy; and
a solid electrolyte positioned between the cathode electrode and the anode electrode and configured to enable transport of lithium ions between the cathode electrode and the anode electrode, wherein the solid electrolyte is in contact with at least a portion of the second particles, wherein the first particles and the second particles individually form discrete domains in the anode electrode as opposed to forming a combined domain comprising silicon and the material,
wherein the second particles are substantially softer than the first particles and configured to compensate for size changes of the first particles during charging and discharging cycles of the solid state battery such that, as the first particles expand in size, the second particles are compressed in size at a given pressure applied to the solid state battery and further such that, as the first particles shrink in size, the second particles expand in size at a given pressure applied to the solid state battery, whereby the second particles generally maintain contact with one another and further with the first particles directly or indirectly, which allows the solid state battery to operate at a substantially lower pressure applied thereto than one that would be required in the absence of the second particles in the anode,
wherein the second particles and the first particles form a bimodal distribution in the anode electrode, wherein the bimodal distribution is configured to reduce porosity of the anode electrode as the second particles are positioned in void space in a lattice of the first particles, the bimodal distribution increases surface contact during charging and discharging cycles of the solid state battery such that the second particles generally maintain contact with one another and further with the first particles directly or indirectly, which allows the solid state battery to operate at a substantially lower pressure applied thereto than one that would be required in the absence of the bimodal distribution in the anode, and
wherein a pressure under 10 MPa is applied to the solid state battery.

2. The solid state battery of claim 1, wherein lithium ion diffusivity in the anode electrode ranges from $1 \times 10^{-14}$ cm$^2$/s to $1 \times 10^{-7}$ cm$^2$/s and wherein the anode electrode has a thickness, wherein the thickness changes less than 10% during the charging and discharging cycles at a given pressure applied to the solid state battery.

3. The solid state battery of claim 1, wherein the first particles have a first hardness in a range of 6 to 8 Mohs hardness values, wherein the second particles have a second hardness in a range of 1 to 4 Mohs hardness values.

4. The solid state battery of claim 1, wherein a weight concentration of lithium in the tin-lithium alloy is configured to change based on the charging status of the solid state battery.

5. The solid state battery of claim 1, wherein the anode active material does not include carbon-based particles, sulfur-based particles, or oxide-based particles.

6. The solid state battery of claim 1, wherein the second particles are substantially free of lithium at the time of assembly of the battery before initial charging and discharging.

7. The solid state battery of claim 1, wherein the anode electrode comprises more first particles than second particles by total weight of the anode active material.

8. The solid state battery of claim 1, wherein the anode active material consists essentially of the first particles and the second particles.

9. The solid state battery of claim 1, wherein the anode active material comprises:

10% to 90% by weight of the first particles based on a total weight of the anode active material; and 10% to 90% by weight of the second particles based on the total weight of the anode active material.

10. The solid state battery of claim 1, wherein the anode active material comprises:

40% to 60% by weight of the first particles based on a total weight of the anode active material; and 40% to 60% by weight of the second particles based on the total weight of the anode active material.

11. The solid state battery of claim 1, wherein the first particles have a first average particle size in a range of 10 μm to 1,000 μm, wherein the second particles have a second particle size in a range of 10 nm to 1,000 nm.

12. The solid state battery of claim 1, wherein the first particles have a first average particle size, wherein the second particles have a second average particle size, wherein the second average particle size is less than half of the first average particle size.

13. The solid state battery of claim 1, wherein the anode electrode comprises a porosity of in a range of 10% to 30% by volume based on a total volume of the anode, the solid state battery has a c-rate of greater than 0.33, the anode electrode is under a pressure in a range of 1 MPa to 5 MPa, and the solid state battery comprises a specific capacity of greater than 100 mAh/g.

14. An electric vehicle comprising the solid state battery of claim 1.

15. An energy storage system for storing power generated by a wind generator and/or a solar power generator, comprising the solid state battery of claim 1.

16. A method of using a solid state battery which comprises:

a cathode electrode;

an anode electrode comprising an anode active material:

first particles comprising silicon, and second particles comprising a tin-lithium alloy, wherein a weight concentration of tin in the tin-lithium alloy is greater than a weight concentration of lithium in the tin-lithium alloy; and a solid electrolyte positioned between the cathode electrode and the anode electrode and configured to enable transport of lithium ions between the cathode electrode and the anode electrode, wherein the solid electrolyte is in contact with at least a portion of the second particles, wherein the first particles and the second particles individually form discrete domains in the anode electrode as opposed to forming a combined domain comprising silicon and the material, wherein the second particles are substantially softer than the first particles and configured to compensate for size changes of the first particles during charging and discharging cycles of the solid state battery such that, as the first particles expand in size, the second particles are compressed in size at a given pressure applied to the solid state battery and further such that, as the first particles shrink in size, the second particles expand in size at a given pressure applied to the solid state battery, whereby the second particles generally maintain contact with one another and further with the first particles directly or indirectly, which allows the solid state battery to operate at a substantially lower pressure applied thereto than one that would be required in the absence of the second particles in the anode, wherein the second particles and the first particles form a bimodal distribution in the anode electrode, wherein the bimodal distribution is configured to reduce porosity of the anode electrode as the second particles are positioned in void space in a lattice of the first particles, the bimodal distribution increases surface contact during charging and discharging cycles of the solid state battery such that the second particles generally maintain contact with one another and further with the first particles directly or indirectly, which allows the solid state battery to operate at a substantially lower pressure applied thereto than one that would be required in the absence of the bimodal distribution in the anode, and wherein a pressure under 10 MPa is applied to the solid state battery, wherein the method comprises:

repeatedly charging and discharging the solid state battery, wherein the anode electrode is in direct contact with the solid electrolyte and the direct contact is substantially maintained after the charging and discharging by compensating for size changes of the first particles by using the second particles.

17. A method of manufacturing a cell of a solid state battery, the method comprising:

depositing a cathode layer;

depositing a solid electrolyte layer;

combining first particles and second particles to form a mixture, the first particles comprising silicon and the second particles comprising a material configured to form an alloy with lithium, wherein the anode does not include carbon-based particles, sulfur-based particles, or oxide-based particles, wherein the second particles are substantially softer than the first particles; and depositing the mixture in an anode layer such that the second particles are configured to compensate for size changes of the first particles during charging and discharging cycles of the solid state battery such that, as the first particles expand in size, the second particles are compressed in size at a given pressure applied to the solid state battery and further such that, as the first particles shrink in size, the second particles expand in size at a given pressure applied to the solid state battery, whereby the second particles generally maintain contact with one another and further with the first particles directly or indirectly, which allows the solid state battery to operate at a substantially lower pressure applied thereto than one that would be required in the absence of the second particles in the anode layer, wherein the second particles and the first particles form a bimodal distribution in the anode layer, wherein the bimodal distribution is configured to reduce porosity of the anode layer as the second particles are positioned in void space in a lattice of the first particles, the bimodal distribution increases surface contact during charging and discharging cycles of the solid state battery such that the second particles generally maintain contact with one another and further with the first particles directly or indirectly, which allows the solid state battery to operate at a substantially lower pressure applied thereto than one that would be required in the absence of the bimodal distribution in the anode; and configuring the solid state battery such that the solid electrolyte layer is positioned intermediate the cathode layer and the anode layer in order to enable transport of lithium ions between the cathode layer and the anode layer, wherein the first particles and the second particles individually form discrete domains in the anode layer as opposed to forming a combined domain comprising silicon and the material.

18. The method of claim 16, wherein the mixture further comprises a solvent and a binder.

19. The method of claim 16, further comprising integrating the solid state battery into an electric vehicle.

\*   \*   \*   \*   \*